United States Patent
Lin et al.

(10) Patent No.: US 6,289,148 B1
(45) Date of Patent: Sep. 11, 2001

(54) FREE-SPACE MICRO-MIRROR WAVELENGTH ADD/DROP MULTIPLEXERS WITH FULL CONNECTIVITY FOR TWO-FIBER RING NETWORKS

(75) Inventors: Lih Y. Lin, Little Silver; Adel A. M. Saleh, Holmdel, both of NJ (US)

(73) Assignee: AT&T Corporation, Middletown, NJ (US)

( * ) Notice: Subject to any disclaimer, the term of this patent is extended or adjusted under 35 U.S.C. 154(b) by 0 days.

(21) Appl. No.: 09/460,822

(22) Filed: Dec. 14, 1999

Related U.S. Application Data

(60) Provisional application No. 60/112,112, filed on Dec. 14, 1998.

(51) Int. Cl.[7] .............................. G02B 6/00; G02B 6/28
(52) U.S. Cl. ............................................................. 385/24
(58) Field of Search .............................. 385/37, 46, 24, 385/48, 96, 16, 43; 359/127, 124, 125, 128

(56) References Cited

U.S. PATENT DOCUMENTS

| | | | |
|---|---|---|---|
| 5,717,795 | * | 2/1998 | Sharma et al. ........................ 385/24 |
| 5,805,751 | * | 9/1998 | Kewitsch et al. ..................... 385/43 |
| 5,875,272 | * | 2/1999 | Kewitsch et al. ..................... 385/37 |
| 6,038,045 | * | 3/2000 | Sotom et al. ......................... 359/128 |
| 6,201,909 | * | 3/2001 | Kewitsch et al. ..................... 385/37 |

* cited by examiner

*Primary Examiner*—Akm E. Ullah
(74) *Attorney, Agent, or Firm*—Kenyon & Kenyon

(57) ABSTRACT

The present invention provides a device for performing wavelength add/drop multiplexing utilizing micromachined free-rotating switch mirrors. The free-space nature of the switch mirrors allow use of the front and back sides of the mirrors for reflecting signals. According to one embodiment of the present invention a WADM is provided in which micromachined switch mirrors are arranged in a polygonal (e.g., hexagonal) geometry, which allows full connectivity.

According to one embodiment a WADM is provided for deployment in a unidirectional two-fiber optical network including service and protection fiber routes. According to this embodiment the WADM includes a first input port for receiving a WDM signal from the service fiber route and a second input port for receiving a WDM signal from the protection fiber route. The WADM also includes a first output port for transmitting a WDM signal to the service fiber route, a second output port for transmitting a WDM signal to the protection fiber route, a third input port for receiving locals signals from a local access port and a third output port for dropping signals to a local access port.

The WADM further includes a reconfigurable switching matrix comprising a plurality of free-space micromirrors, for performing routing of signals from the various input ports to the various output ports.

According to an alternative embodiment a WADM is provided for deployment in a bidirectional two-fiber optical network including two service/protection routes.

15 Claims, 28 Drawing Sheets

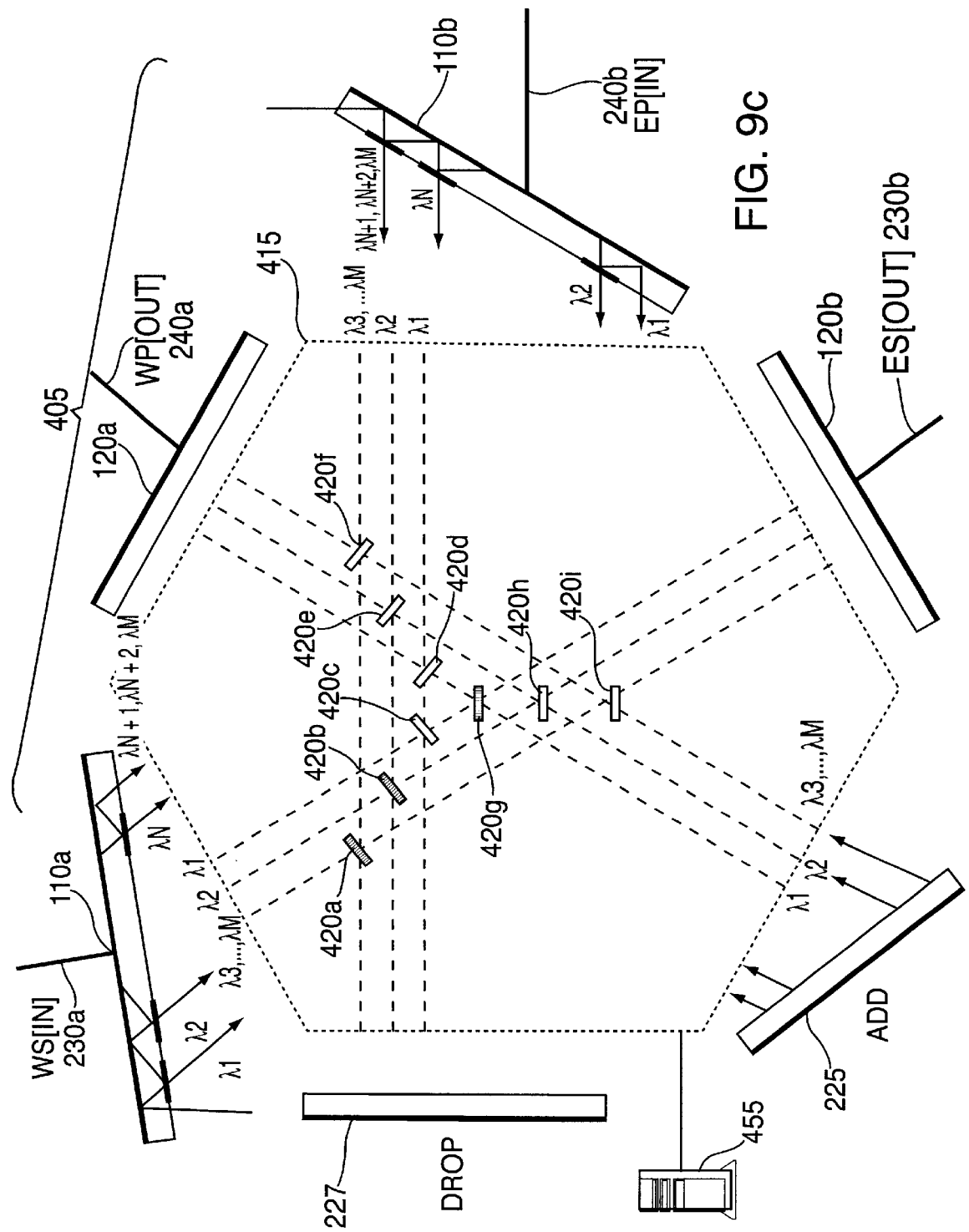

FREE-SPACE MICRO-MIRROR WAVELENGTH ADD/DROP MULTIPLEXERS WITH FULL CONNECTIVITY FOR TWO-FIBER RING NETWORKS

PRIOR PROVISIONAL PATENT APPLICATION

The present application claims the benefit under 35 U.S.C. § 119(e) of U.S. Provisional Application No. 60/112,112 filed Dec. 14, 1998.

FIELD OF THE INVENTION

The present invention relates to optical networks. In particular, the present invention relates to a device for performing add/drop multiplexing in two-fiber ring networks.

BACKGROUND INFORMATION

With the growing capacity demand for optical fiber communications, wavelength add/drop multiplexers ("WADM") are essential components in any optical network. In particular WADMs are critical components in wavelength division-multiplexed ("WDM") regional-access ring or bus networks to provide access to local customers.

Current technology utilizes configurable wavelength 2×2 switches inserted in wavelength paths. FIG. 1, which is prior art, depicts an example of a conventional WADM architecture. The conventional WADM includes input port 140, demultiplexer 110, multiplexer 120, output port 130 and a plurality of 2×2 switches 105(1)–105(M). A WDM signal including a plurality of multiplexed signals $\lambda_1$–$\lambda_M$ is received at input port 140 and transmitted to demultiplexer 110. Wavelengths $\lambda_1$–$\lambda_M$ received via local access ports (not shown) may be added via respective switches 105(1)–105(M). Conversely, wavelengths $\lambda_1$–$\lambda_M$ from the demultiplexed signal may be dropped via switches 105(1)–105(M) to local access ports (not shown). A particular wavelength $\lambda$ is dropped to and added from the local port if the respective 2×2 switch (105) is in a cross-state, while it is sent directly to output port 130 when the switch is in a through state. 2×2 switches 105 may be of a discrete or integrated form.

Ring networks have become very popular in the carrier world as well as in enterprise networks. A ring is the simplest topology that is two-connected, i.e., provides two separate paths between any pair of nodes. This allows a ring network to be resilient to failures. These rings are called self-healing because they incorporate protection mechanisms that detect failures and reroute traffic away from failed links and nodes onto other routes rapidly. A unidirectional ring carries working traffic only in one direction of the ring (e.g., clockwise).

FIG. 2a, which is prior art, depicts the topology of a unidirectional ring network. A unidirectional ring network carries working traffic in only one direction of the ring (e.g., clockwise), along service fiber 230. WADMs 210a–210d provide functionality for dropping and adding wavelengths via local access ports 220a–220d respectively. For example, working traffic from WADM 210a to 210b is carried clockwise along the ring and working traffic from WADM 210b to 210a is also carried clockwise on a different set of links in the ring. Protection fiber 240 provides a backup route in the case of a fiber cut or equipment malfunction in the working fiber 230. Traffic from WADM 210a to WADM 210b is sent simultaneously on working fiber 230 in the clockwise direction and protection fiber 240 in the counter-clockwise direction.

FIG. 2b, which is prior art, depicts the topology of a bi-directional two-fiber ring network. Note that both fiber routes 230a and 230b in FIG. 2b carry a non-overlapping sub-set of wavelengths (e.g., even and odd number wavelengths). Thus, both fiber routes 230a and 230b are working/protection fiber since one direction can function as the protection route for the other direction (because the wavelengths are non-overlapping). For example, in an even/odd arrangement, signals in the protection routes would be even number wavelengths in odd number wavelength fiber routes and odd number wavelengths in even number wavelength fiber routes.

Typically, WADMs require additional functionality to enable loop-back for maintenance or to switch the signal to a restoration path in the case of a fiber cut or equipment malfunction. FIG. 3, which is prior art, depicts typical connectivity requirements for a WADM in a uni-directional ring network. WADM 210 must be able to switch signals from $WS_{IN}$ (west service input) 230a to $WP_{OUT}$ 240b (west protection output) for loop-back maintenance. Also, if a failure or fiber cut occurs on the east side of WADM 210, wavelengths from local access ports 220 must be switched to $WP_{OUT}$ 240b for restoring the network traffic. Likewise WADM 210 must switch signals arriving from $WS_{IN}$ 230a originally destined for $ES_{OUT}$ 230b to $WP_{OUT}$ 240b.

Although the functions required as shown in FIG. 3 may be achieved by a 3×3 cross-bar matrix or three 1×3 switches for each wavelength path, the utilization of switch points is inefficient. This results in an increase of the complexity of the electronic controls, size and cost of the WADM device.

SUMMARY OF THE INVENTION

The present invention provides a device for performing wavelength add/drop multiplexing utilizing micromachined free-rotating switch mirrors. The free-space nature of the switch mirrors allow use of the front and back sides of the mirrors for reflecting signals. According to one embodiment of the present invention a WADM is provided in which micromachined switch mirrors are arranged in a polygonal (e.g., hexagonal) geometry, which allows full connectivity.

According to one embodiment a WADM is provided for deployment in a unidirectional two-fiber optical network including service and protection fiber routes. According to this embodiment the WADM includes a first input port for receiving a WDM signal from the service fiber route and a second input port for receiving a WDM signal from the protection fiber route. The WADM also includes a first output port for transmitting a WDM signal to the service fiber route, a second output port for transmitting a WDM signal to the protection fiber route, a third input port for receiving locals signals from a local access port and a third output port for dropping signals to a local access port.

The WADM further includes a reconfigurable switching matrix comprising a plurality of free-space micromirrors, for performing routing of signals from the various input ports to the various output ports.

According to an alternative embodiment a WADM is provided for deployment in a bidirectional two-fiber optical network including two service/protection routes.

BRIEF DESCRIPTION OF THE DRAWINGS

FIG. 9c depicts the configuration of a switching matrix of micromirrors in a WADM in a unidirectional two-fiber optical network under service failure of west side service and protection fiber routes according to one embodiment of the present invention.

DETAILED DESCRIPTION

Figure 4:
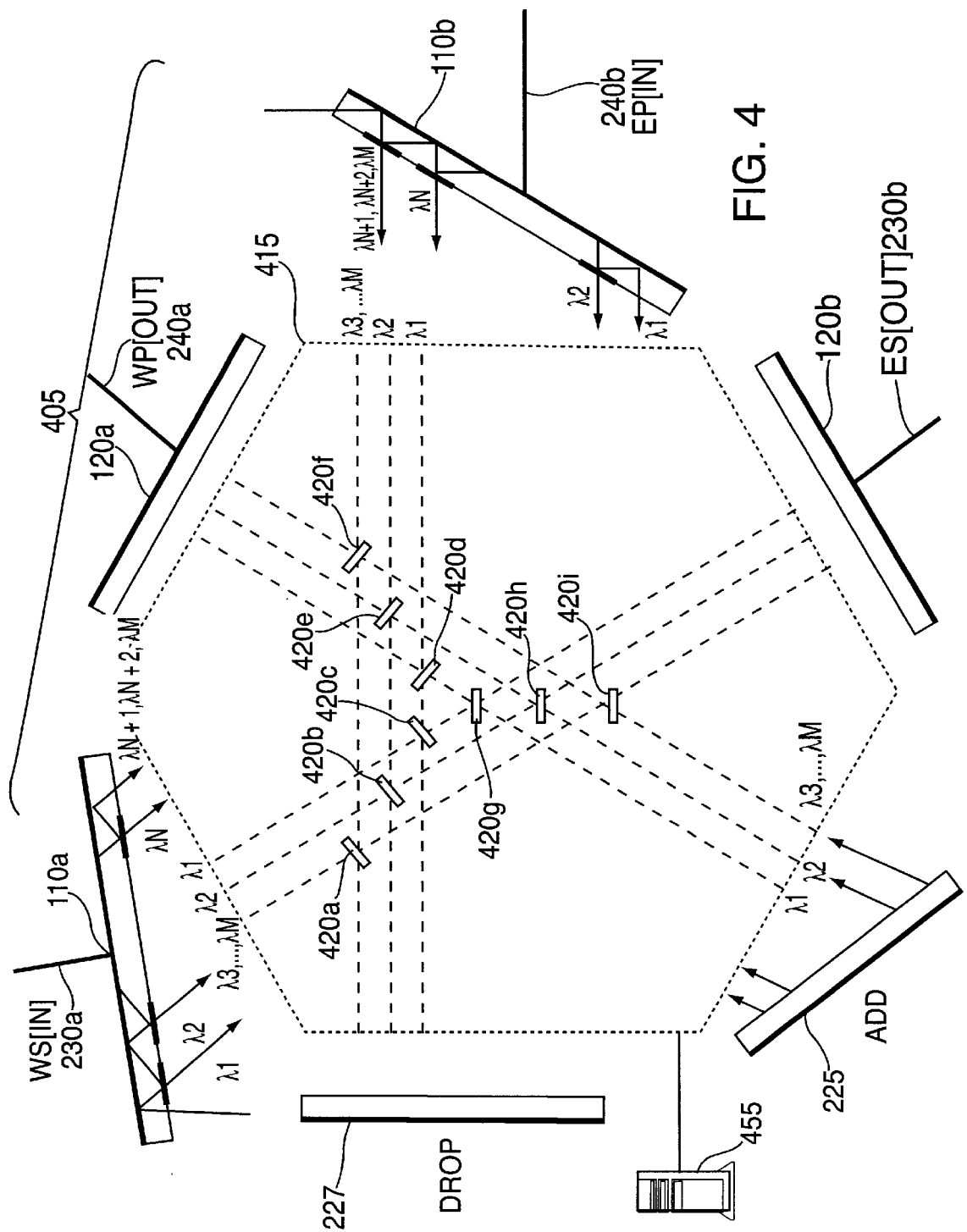
FIG. 4 is a block diagram of a WADM utilizing micromachined free-space mirrors for deployment in a unidirectional ring network according to one embodiment of the present invention.

FIG. 4 is a block diagram of a WADM utilizing micromachined free-space mirrors for deployment in a unidirectional ring network according to one embodiment of the present invention. WADM 405 includes a first demultiplexer 110a for demultiplexing a WDM signal arriving from a west service fiber 230a ("$WS_{IN}$"), a second demultiplexer 110b for demultiplexing a WDM signal arriving from an east protection fiber 240b ("$EP_{IN}$"), a first multiplexer 120a for performing multiplexing of signals for transmission onto a west protection fiber 240a ("$WP_{OUT}$") and a second multiplexer 120b for performing multiplexing of signals onto an east service fiber 230b ("$ES_{OUT}$"). WADM 405 also includes add port 225 for receiving signals from a local access port (not shown), drop port 227 (for transmitting signals to a local drop port (not shown)) and switch fabric 415. Switch fabric 415 includes a plurality of free-space micromachined mirrors 420a–420i. Although FIG. 4 does not depict a particular method for coupling of the various fibers to the multiplexers and demultiplexers, it is assumed that this would be understood by a practitioner skilled in the art. In particular, although not depicted in FIG. 4, WADM 405 includes a first input port coupled between west service fiber 230a and first demultiplexer 110a, a second input port coupled between east protection fiber 240b and second demultiplexer 110b, a third input port coupled between add port 225 and a local access port (not shown) and a third output port coupled between drop port 227 and a local access port (not shown).

WADM 405 performs adding (to add port 225) and dropping (to drop port 227) of a maximum number of N wavelengths from local customers. WADM transmits a remaining number of M–N wavelengths through the node. For example, WADM 405 shown in FIG. 4 performs adding and dropping of two wavelengths $\lambda_1$ and $\lambda_2$ and transmits wavelengths $\lambda_{N+1}, \lambda_{N+2}, \ldots, \lambda_M$ through the node. In general, the number of mirrors 420 and layout in switch fabric 415 will depend upon the number of wavelengths added/dropped from the node. The number of wavelengths added/dropped at a particular WADM is reconfigurable up to a maximum capacity depending on the physical structure of the WADM.

WADM controller 455 controls the actuation of mirrors 420 in switch fabric 415. Each micromachined mirror 420 may assume an actuated or non-actuated state, which determines the routing of wavelengths. For example, if mirror 420c is deployed, wavelength $\lambda_1$ received from $WS_{IN}$ 230a is dropped to drop port 227. Or, for example, if mirror 420h is actuated, $\lambda_1$ from add port 225 is reflected to $ES_{OUT}$ 230b. Various example configurations of micromachined mirrors 420 in switch fabric 415 are described in detail below. The actuation of a particular micromachined mirror is described in more detail below.

Figure 5:
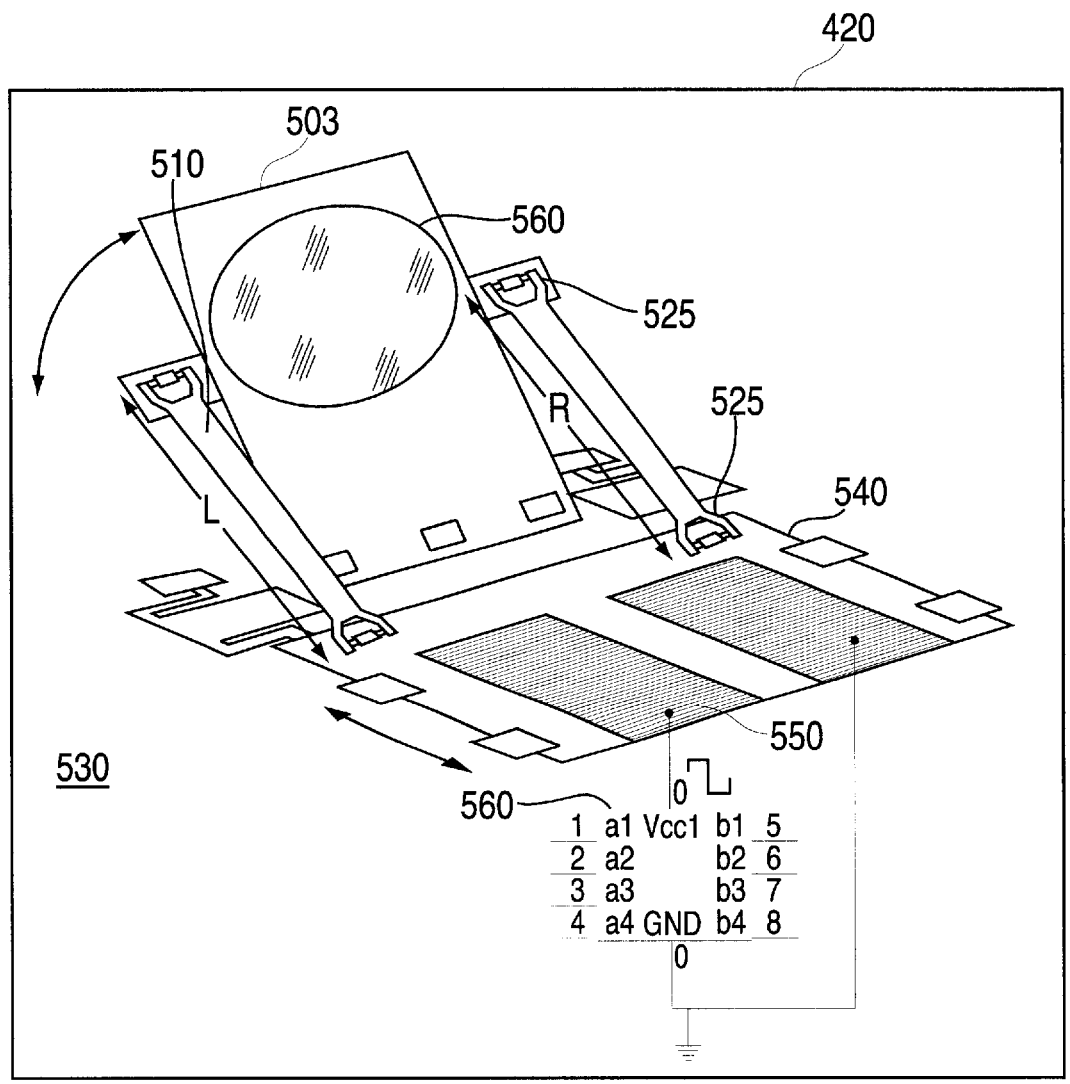
FIG. 5 depicts a microactuated switch mirror according to one embodiment of the present invention.

FIG. 5 depicts a microactuated switch mirror according to one embodiment of the present invention. FIG. 5 shows mirror 503, which includes reflecting surface 560. Mirror 503 is coupled to translation plate 540 via pushrod 510 and hinge joint 525. Microactuated mirror 420 also includes spring 530. Translation plate 540 includes scratch drive actuator 550. Mirror 503 is pivoted on a substrate (not shown) via hinge joint 525. Pushrod 510 couples switch mirror 420 with translation plate 540 through hinge joints 525 and convert plate translation into mirror rotation efficiently. Translation plate 540 is integrated with high-precision scratch drive actuators 550. Translation plate 540 translation distance and therefore switch mirror 420 rotation angle is determined by the number of bias pulses applied to scratch drive actuator 550. Drive actuators 550 are controlled by mirror actuation control unit 560, based upon switching decisions determined by WADM controller 455. In particular, upon the receipt of a signal to actuate a particular mirror 420, mirror actuation control unit 560 applies a bias voltage via drive actuators 550, which causes that particular mirror to actuate. Conversely, to de-actuate a mirror 420, mirror actuation control unit 560 couples drive actuators 550 to ground.

Figure 6:
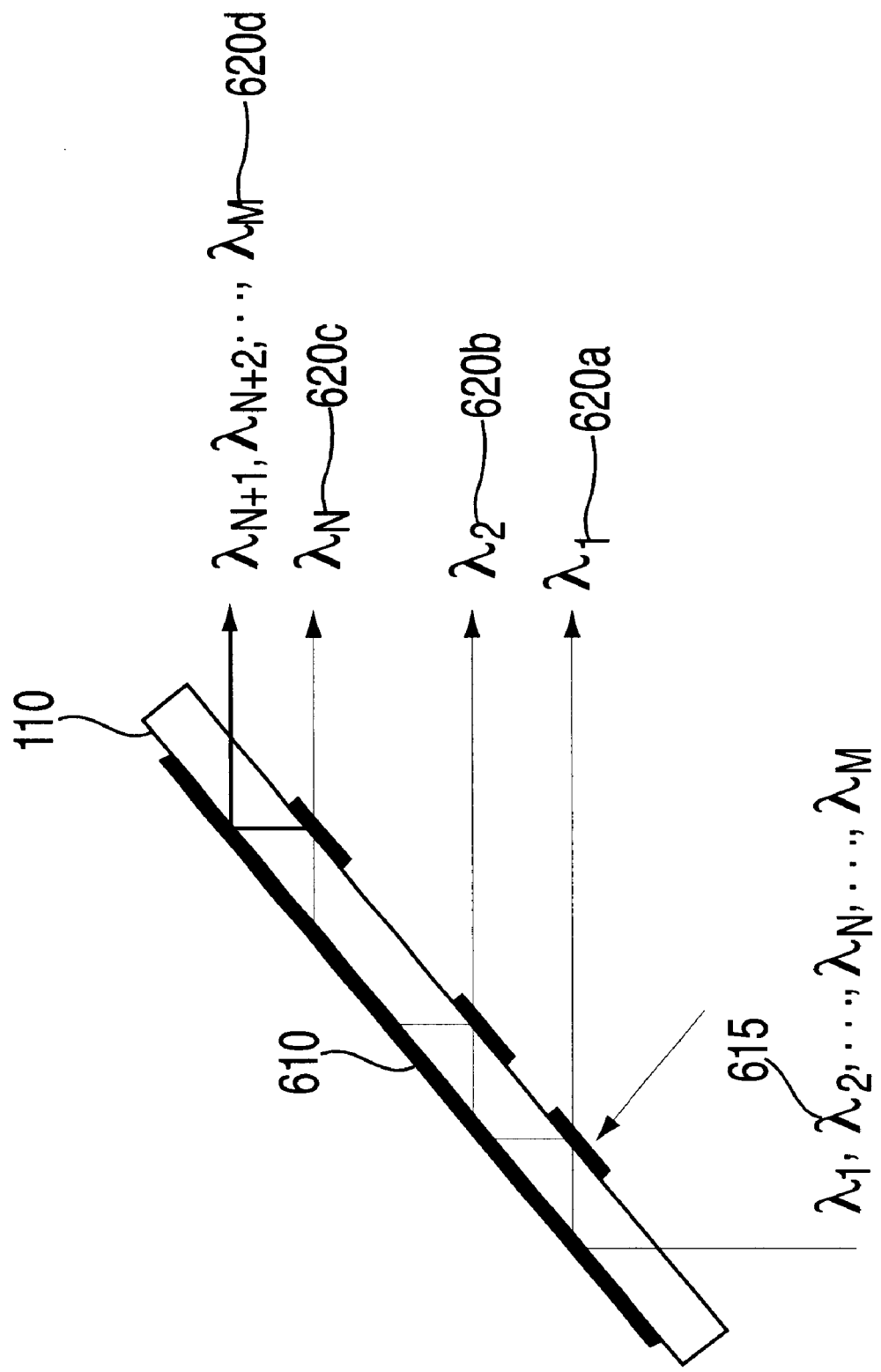
FIG. 6 is a block diagram of a demultiplexer utilizing OCA microplasma technology according to one embodiment of the present invention.

FIG. 6 is a block diagram of a demultiplexer utilizing OCA microplasma technology according to one embodiment of the present invention. Demultiplexer 110 receives a WDM input signal 615 and generates N+M output signals 620a–620d. Rather than employing conventional OCA demultiplexer technology where filters for different wavelengths are distributed on both sides of a glass plate, a high reflection coating 610 is employed on one of side of the glass plate so that all outputs 620a are on the other side. The advantage of this approach is that the free-space outputs can incident directly into the micro-mirror switches 120 with proper alignment. By reversing the light propagation, this technology may be used to perform Muxing (not shown here). Thus, multiplexers 120 in WADM utilize a similar approach. However, the present invention is not limited to the use of the single-sided high reflection coating approach depicted in FIG. 6. With adequate packaging and fiber-interconnection, other MUX/DEMUX technologies may be used with the free-rotating micro-mirrors 120 as a part of an overall WADM architecture.

Figure 7:
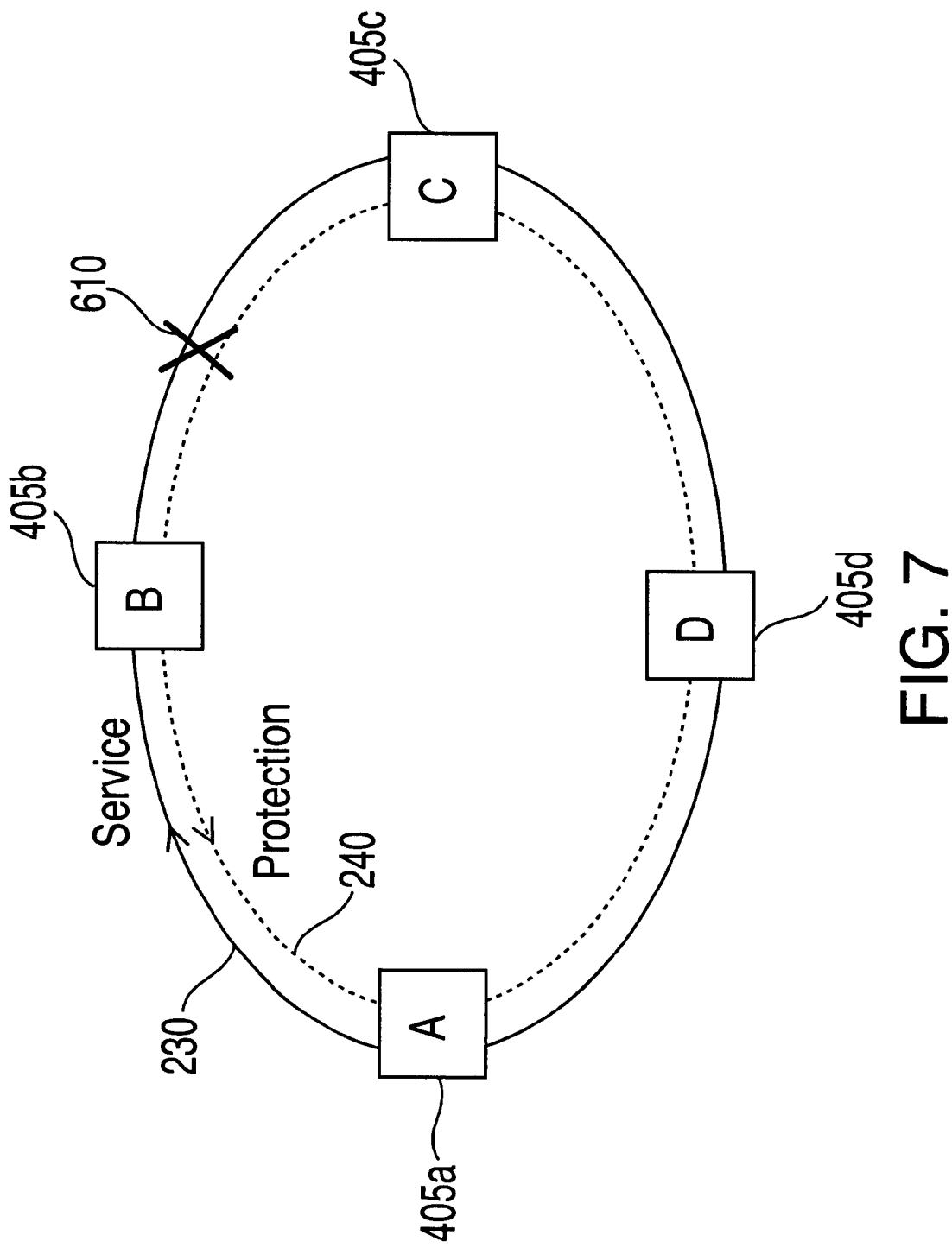
FIG. 7 depicts a unidirectional two-fiber ring network, assuming a fiber cut occurs according to one embodiment of the present invention.

FIG. 7 depicts a unidirectional two-fiber ring network, assuming a fiber cut occurs according to one embodiment of the present invention. In particular, FIG. 7 depicts WADMs 405a–405d coupled via service fiber 230 and protection fiber 240. FIG. 7 also shows a hypothetical fiber cut 610 in the service fiber 230 output of node 405b and protection fiber 240 input of node 405b.

Figure 8A:
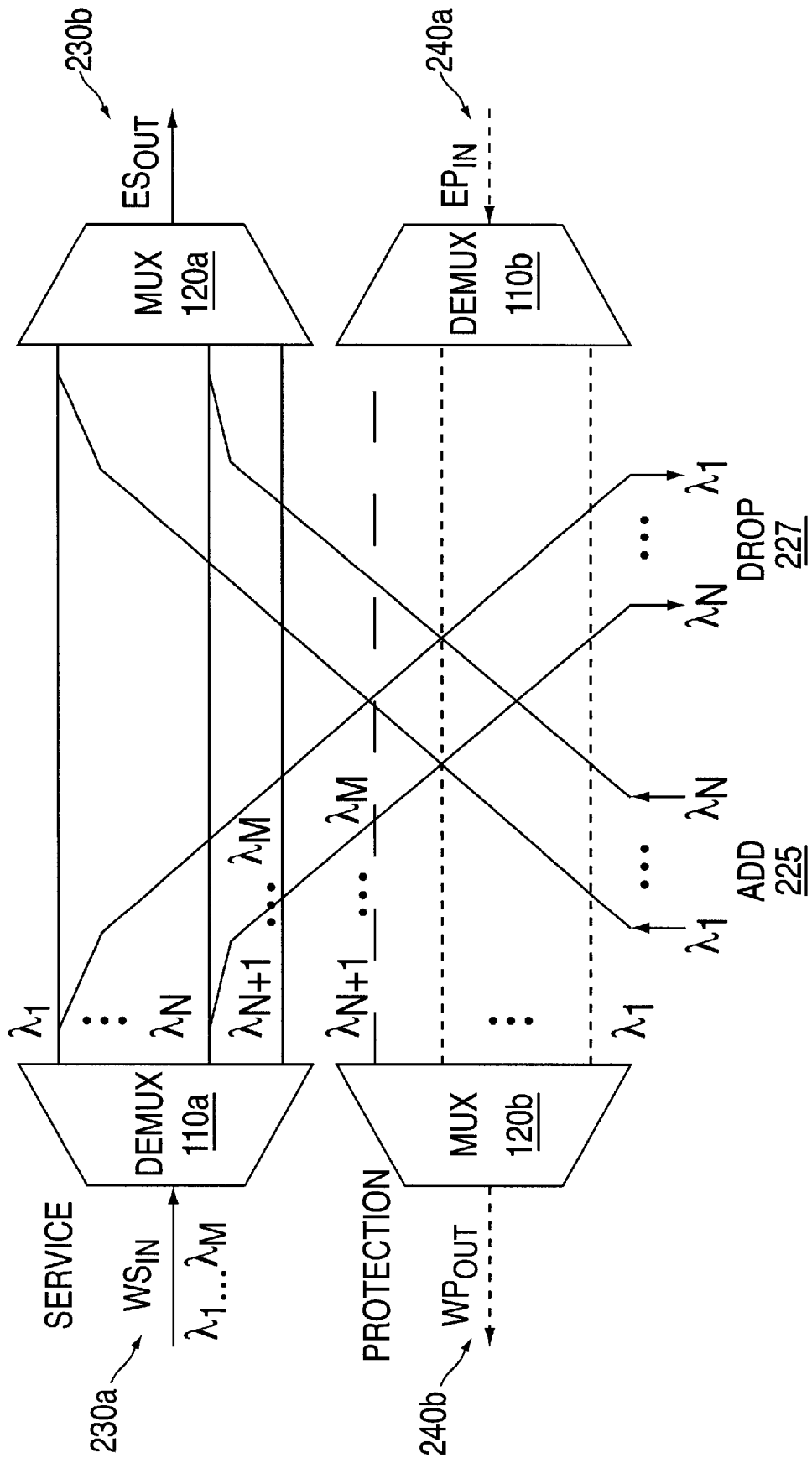
FIG. 8a depicts a WADM node with unidirectional traffic under the situation of normal service according to one embodiment of the present invention.

FIGS. 8a–8d depict routing operations performed at various WADMs depending upon a single fiber failure that occur in a unidirectional fiber ring network according to one embodiment of the present invention. In particular, FIG. 8a depicts the resulting configuration of WADM 405a in the case of a fiber cut shown in FIG. 7. Note that WADM 405a assumes normal functioning in that wavelengths $\lambda_1$ and $\lambda_2$ are added/dropped while wavelengths $\lambda_{N+1} \ldots \lambda_M$ are transmitted through WADM 405a. Thus, some signals are routed back to the protection fiber 240 and express through WADM 405a. This is indicated by the thicker dashed line in FIG. 8a.

Figure 8B:
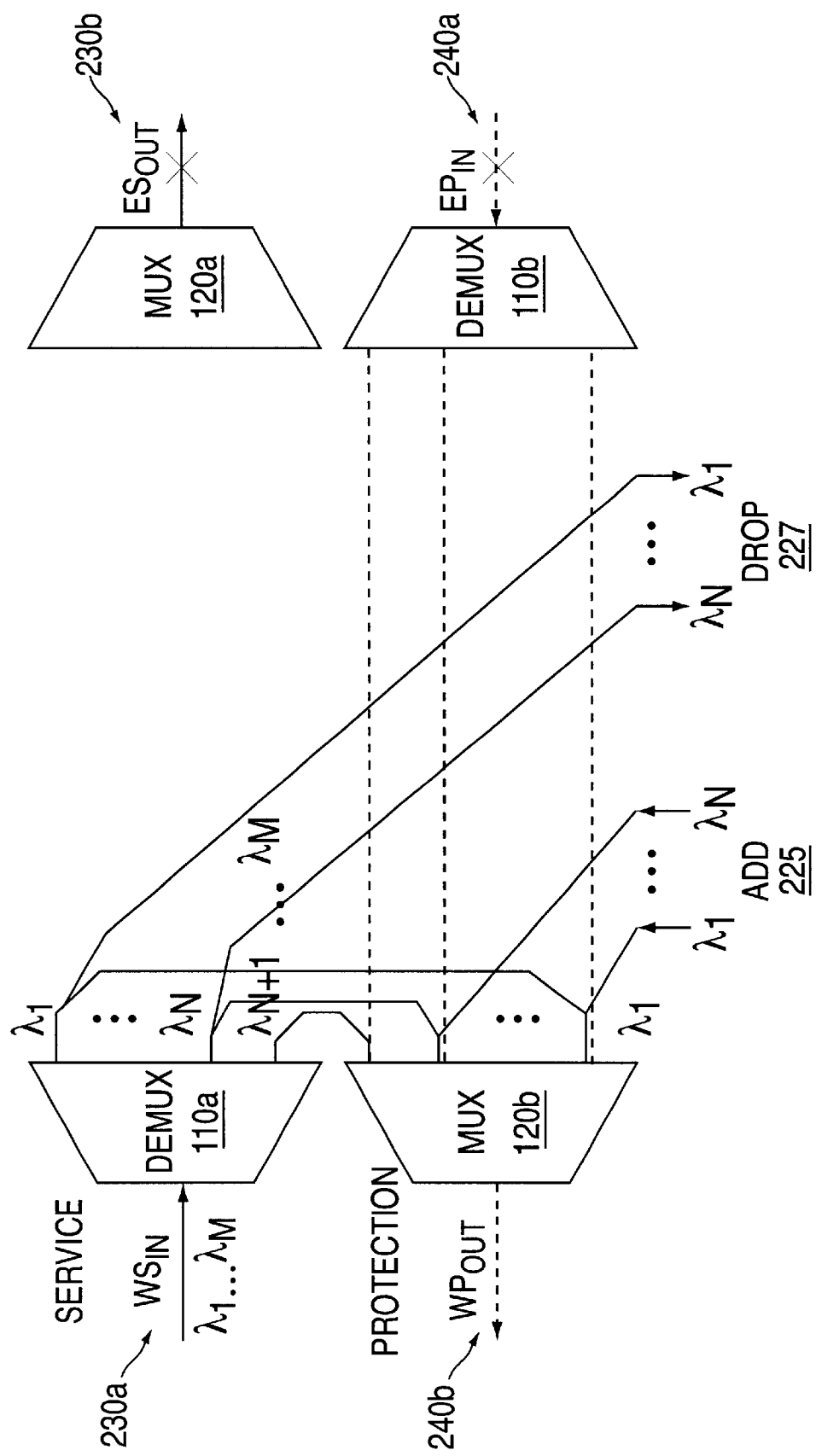
FIG. 8b depicts a WADM node with unidirectional traffic under the situation of failure on east side service and protection routes according to one embodiment of the present invention.
Figure 8C:
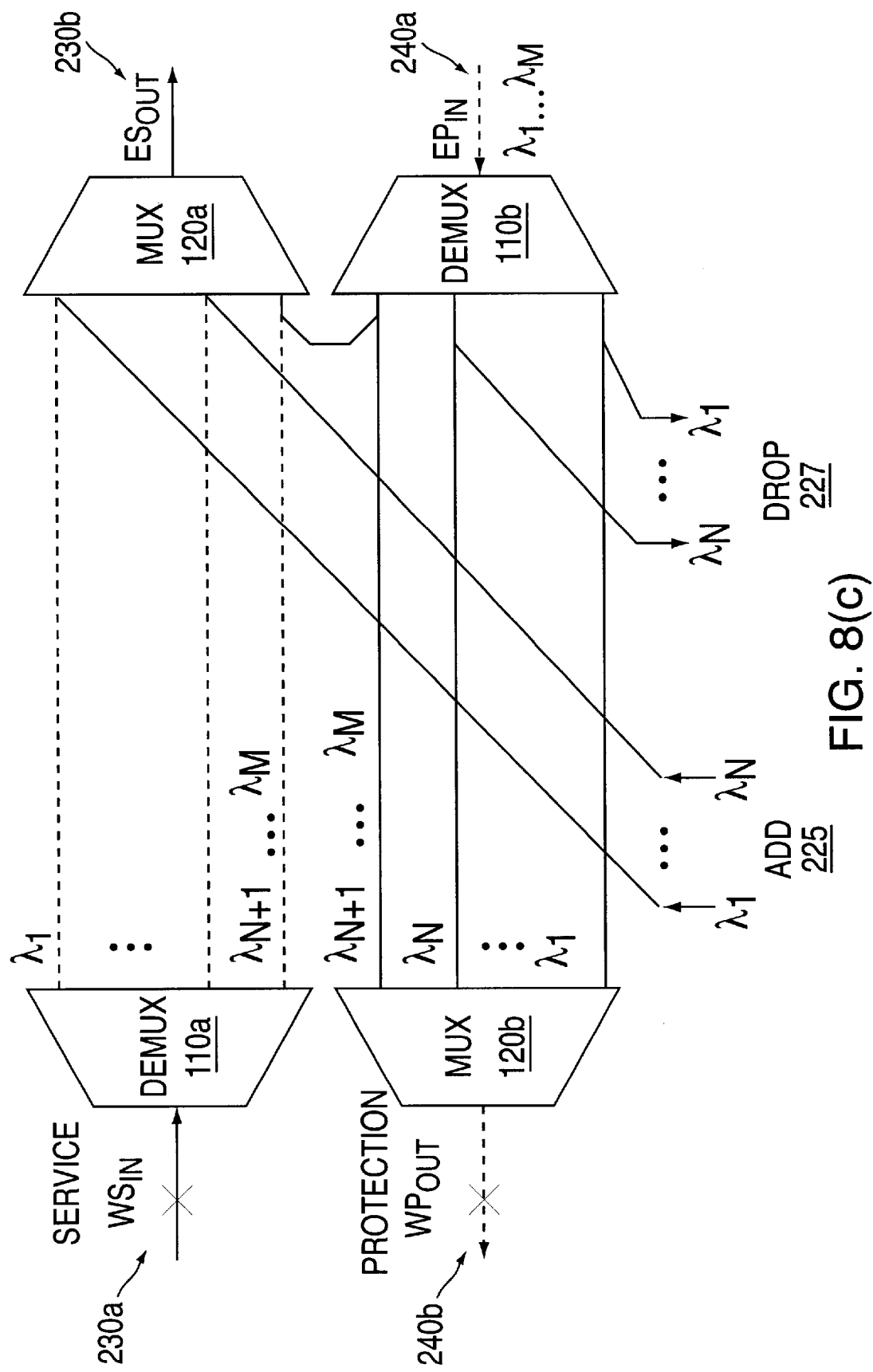
FIG. 8c depicts a WADM node with unidirectional traffic under the situation of failure on west side service and protection routes according to one embodiment of the present invention.

FIG. 8b depicts the resulting configuration of WADM 405b in the case of a fiber cut as shown in FIG. 7. In particular, WADM 405b "observes" a fiber-failure on the $ES_{OUT}$ 230b and $EP_{IN}$ 240b fiber routes. All of the through wavelengths $\lambda_{N+1} \ldots \lambda_M$ are routed to $WP_{OUT}$ 240a. In additional, all the wavelengths from the local add port 225 are also switched to the $WP_{OUT}$ fiber route 240a. FIG. 8c depicts the configuration of WADM 405c in the case of a fiber failure as depicted in FIG. 7. In particular, WADM 405c observes a failure on fiber routes $WS_{IN}$ 230a and $WP_{OUT}$ 240a. Signals used by WADM 405c from protection fiber 240 $EP_{IN}$ 240b are routed to drop port 227, while signals from add port 225 are switched to $ES_{OUT}$ fiber 230b. In addition, the unused signals from $EP_{IN}$ 240b are routed to $ES_{OUT}$ 230b.

Figure 8D:
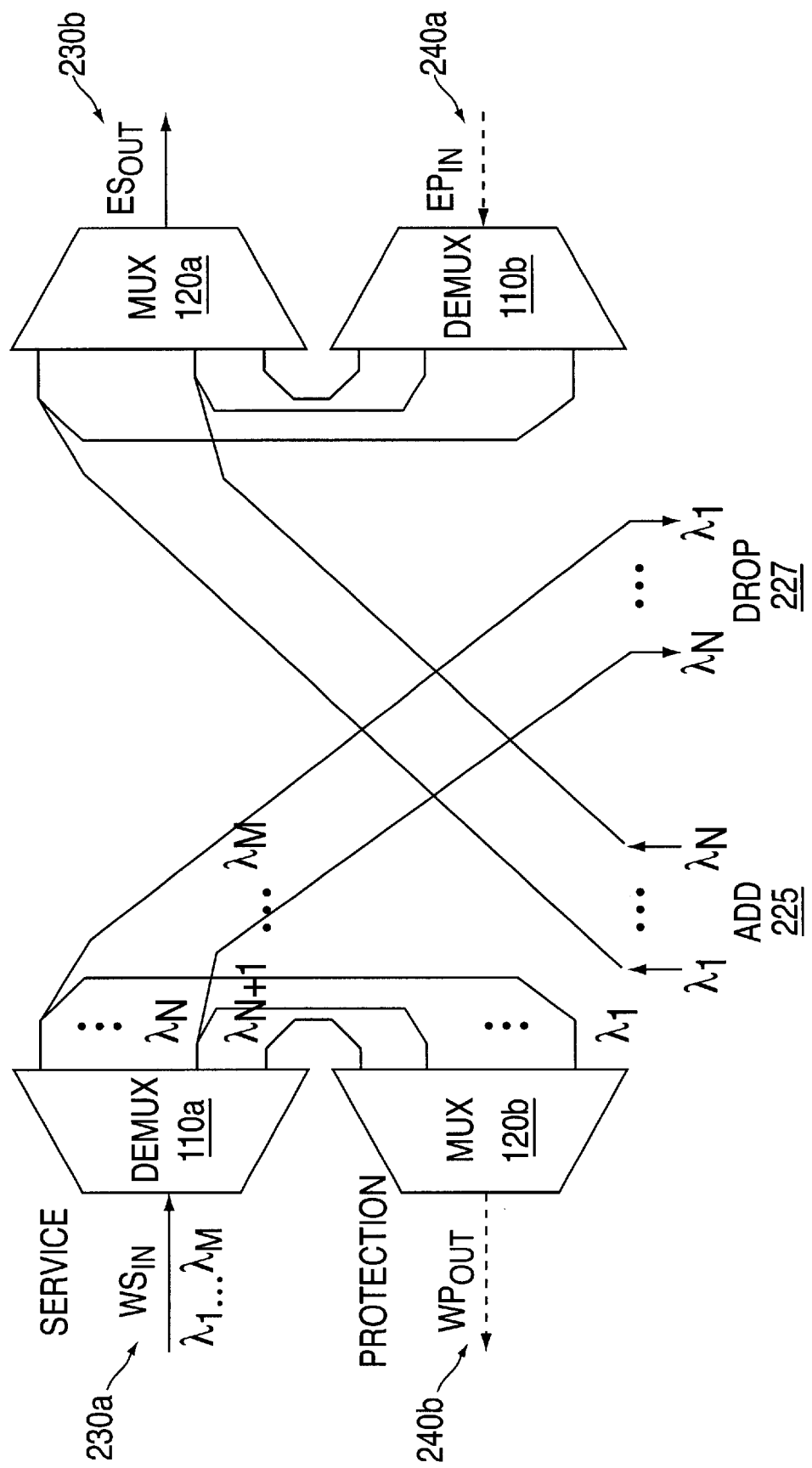
FIG. 8d depicts a WADM node with unidirectional traffic under the situation of loop-back according to one embodiment of the present invention.

FIG. 8d depicts a loopback configuration, which is necessary for all nodes (e.g., 405a–405d). As shown in FIG. 5d, signals from $WS_{IN}$ 230a that are not dropped to drop port 227 are switched back to $WP_{OUT}$ 240a. Similar operation holds for signals arriving from $EP_{IN}$ 240b.

Figure 9A:
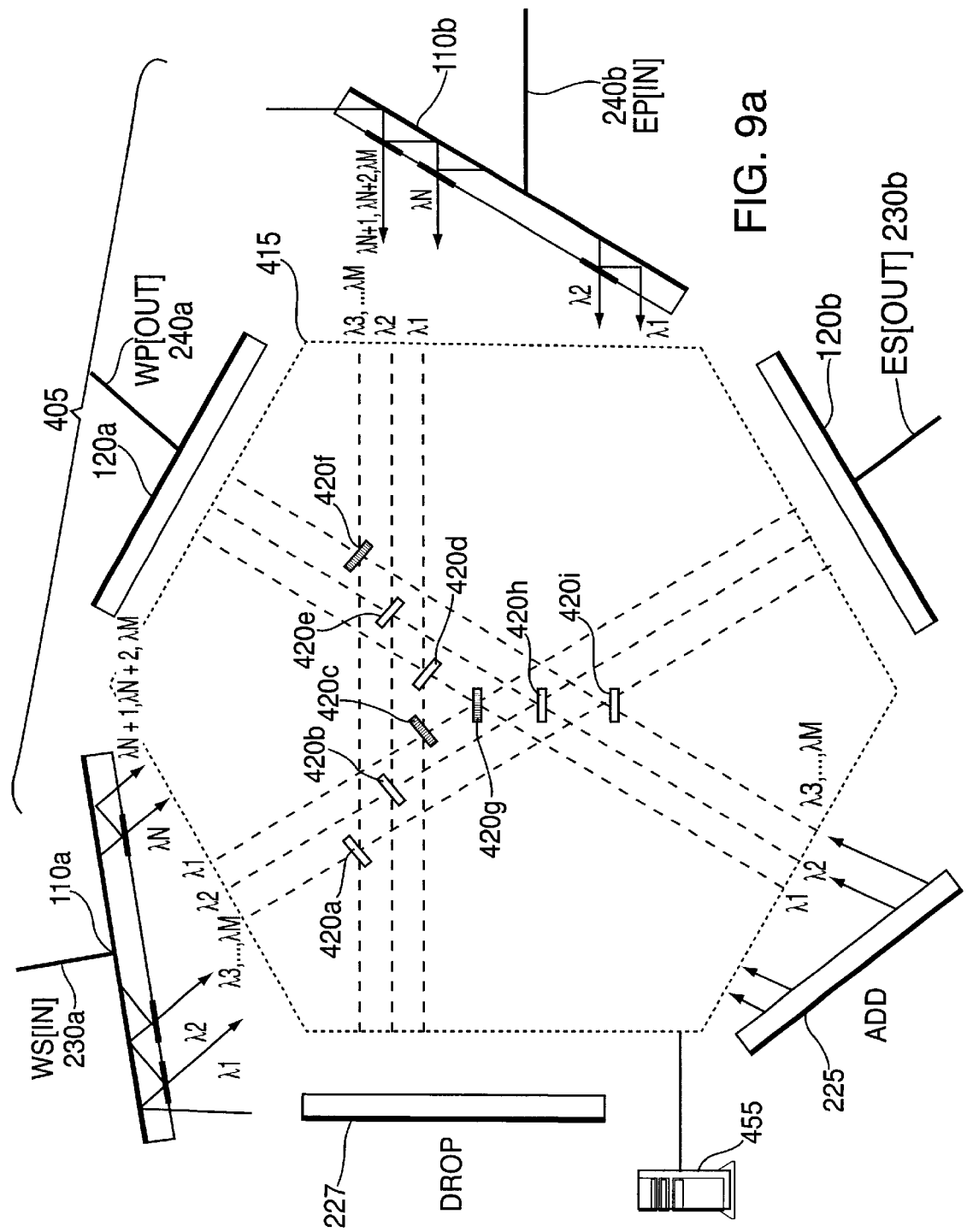
FIG. 9a depicts the configuration of a switching matrix of micromirrors in a WADM in a unidirectional two-fiber optical network under normal service conditions according to one embodiment of the present invention.

FIGS. 9a–9d depict exemplary configurations for a WADM to achieve the switching functionality as illustrated in FIGS. 8a–8d respectively. However, unlike FIGS. 8a–8d, in FIGS. 9a–9d it is assumed that wavelength $\lambda_1$ is used by the respective WADM 405, while wavelength $\lambda_2$ is not used. It is assumed for this example that N=2. However, the present invention is compatible and may be implemented for any arbitrary number of wavelengths N. FIG. 9a depicts normal operations (i.e., WADM 405a), in which mirrors 420c, 420f and 420g are all actuated (on position, reflection state). Mirror 420c serves to reflect wavelength $\lambda_1$ arriving from fiber $WS_{IN}$ 230a to drop port 227. Mirror 420g serves to reflect signals of wavelength $\lambda_1$ from add port 225 to fiber $ES_{OUT}$ 230b. Mirror 420f serves to reflect wavelengths $\lambda_{N+1} \ldots \lambda_M$ arriving from $EP_{IN}$ 240b to $WP_{OUT}$ 240a.

Figure 9B:
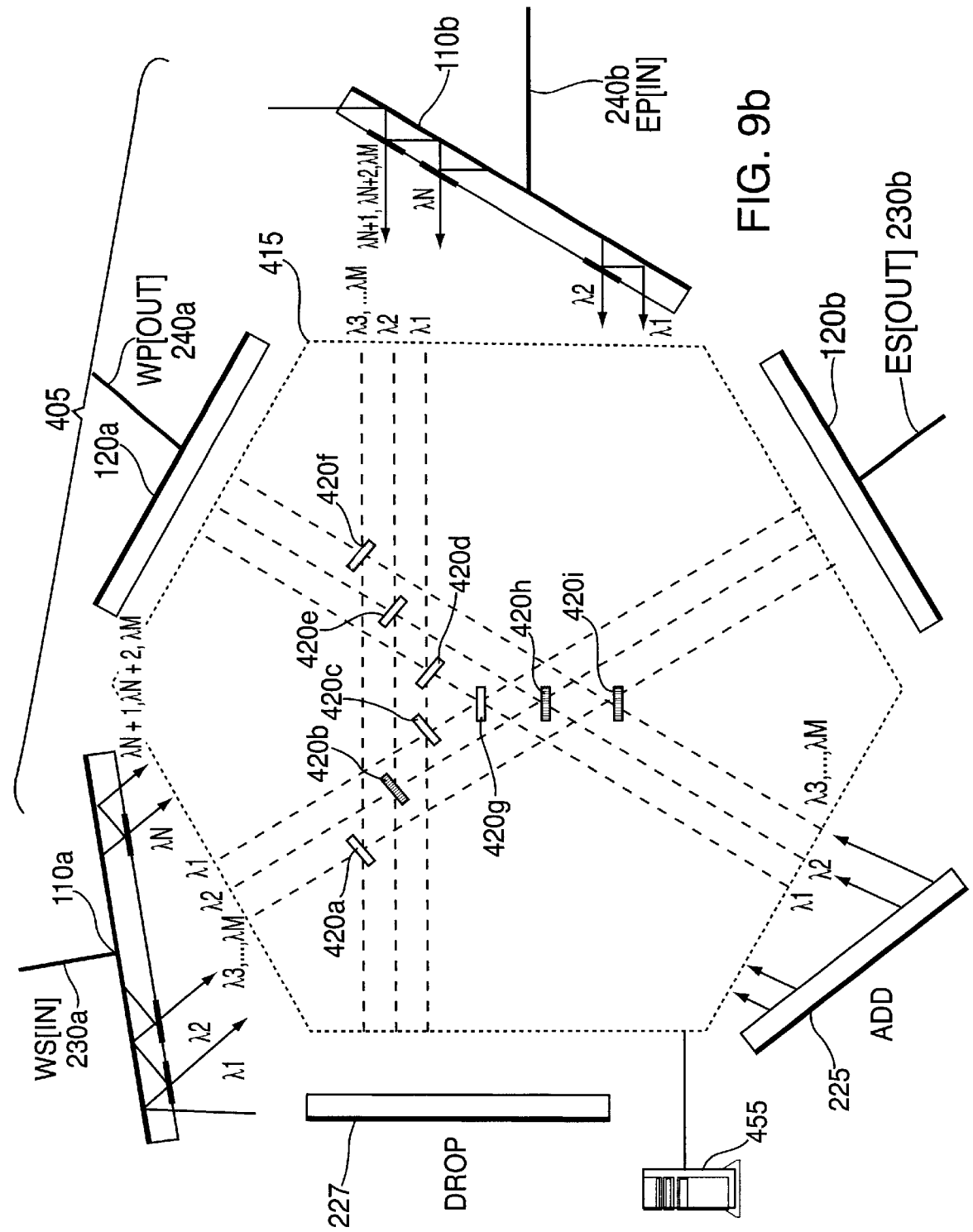
FIG. 9b depicts the configuration of a switching matrix of micromirrors in a WADM in a unidirectional two-fiber optical network under service failure of east side service and protection fiber routes according to one embodiment of the present invention.

FIG. 9b depicts a configuration at WADM 405b assuming a fiber failure as shown in FIG. 7. Corresponding to the functionality depicted in FIG. 5b, mirrors 420b, 420h and 420i are actuated. Mirror 420b serves to reflect wavelength $\lambda_1$ arriving from fiber $WS_{IN}$ 230a to drop port 227. Mirror 420h serves to reflect signals of wavelength from add port 225 to fiber $ES_{OUT}$ 230b. Mirror 420i is actuated to reflect wavelengths $\lambda_{N+1} \ldots \lambda_M$ arriving from $WS_{IN}$ 230a to $WP_{OUT}$ 240a (loopback operation).

FIG. 9c depicts a configuration at WADM 405c assuming a fiber failure as shown in FIG. 7. Mirrors 420a, 420b and 420g are actuated. Note that wavelength $\lambda_1$ arriving from $EP_{IN}$ 240b is dropped because mirrors 420c and 420d are off. Wavelength $\lambda_1$ from local add port 225 is reflected via mirror 420g to $ES_{OUT}$ 230b. Wavelengths $\lambda_{N+1} \ldots \lambda_M$ arriving from $EP_{IN}$ 240b are reflected to $ES_{OUT}$ 230b via mirror 420a.

Figure 9D:
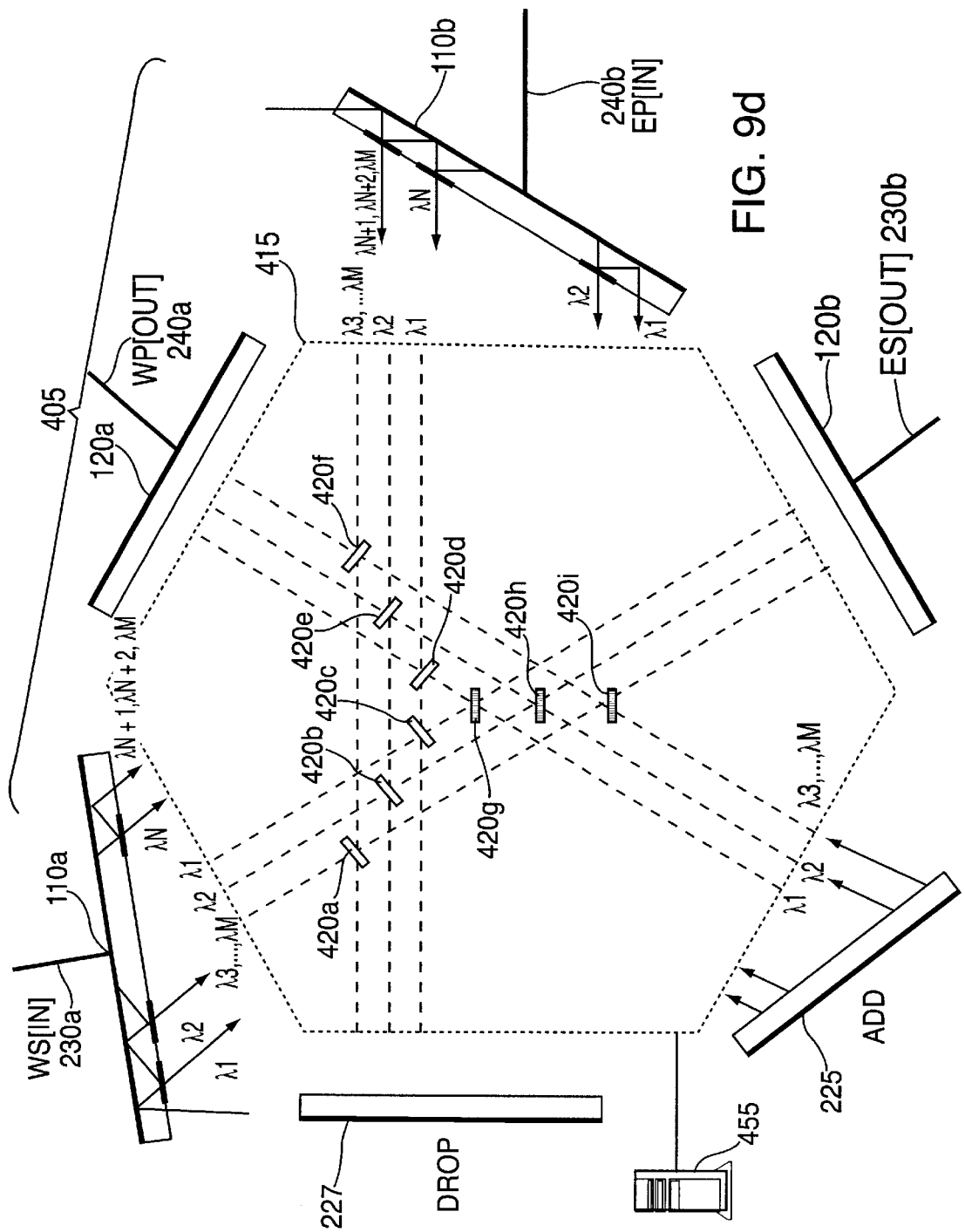
FIG. 9d depicts the configuration of a switching matrix of micromirrors in a WADM in a unidirectional two-fiber optical network under loop-back conditions according to one embodiment of the present invention.

FIG. 9d depicts a configuration at a WADM 405d to achieve a loopback operation. Mirrors 420g, 420h and 420i are actuated to switch signals arriving from $WS_{IN}$ 230a to $WP_{OUT}$ 240a. Mirrors 420a–420c can then be actuated (with the remaining mirrors deactuated) to switch signals from $EP_{IN}$ 240b to $ES_{OUT}$ 230b.

Figure 10:
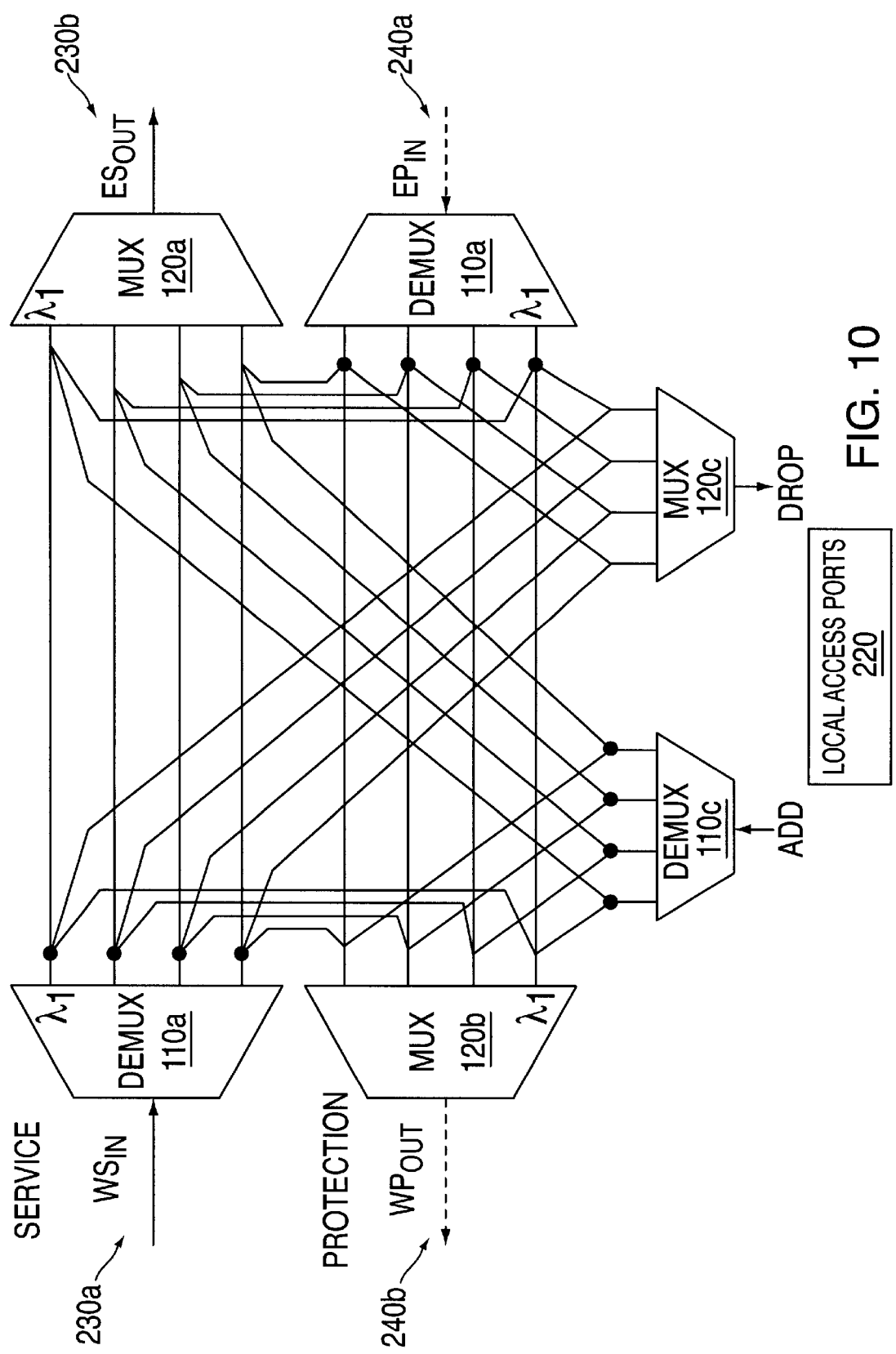
FIG. 10 depicts a WADM with a signal access port in a unidirectional two-fiber network according to one embodiment of the present invention.

FIG. 10 depicts a WADM with a signal access port in a unidirectional two-fiber network according to one embodiment of the present invention. The architecture depicted in FIG. 10 is similar to that shown in FIG. 3. However, WADM 405 includes additional demultiplexer 110c and multiplexer 120c. Thus, demultiplexer 110c and multiplexer 120c are combined in the access port 220 to combine the signals. This results in multiwavelength single-fiber access to the customer and therefore cost savings in fiber installation. Utilizing this approach WADM functions can be accomplished via the same mirror arrangement as depicted in FIGS. 9a–9d.

Figure 11:
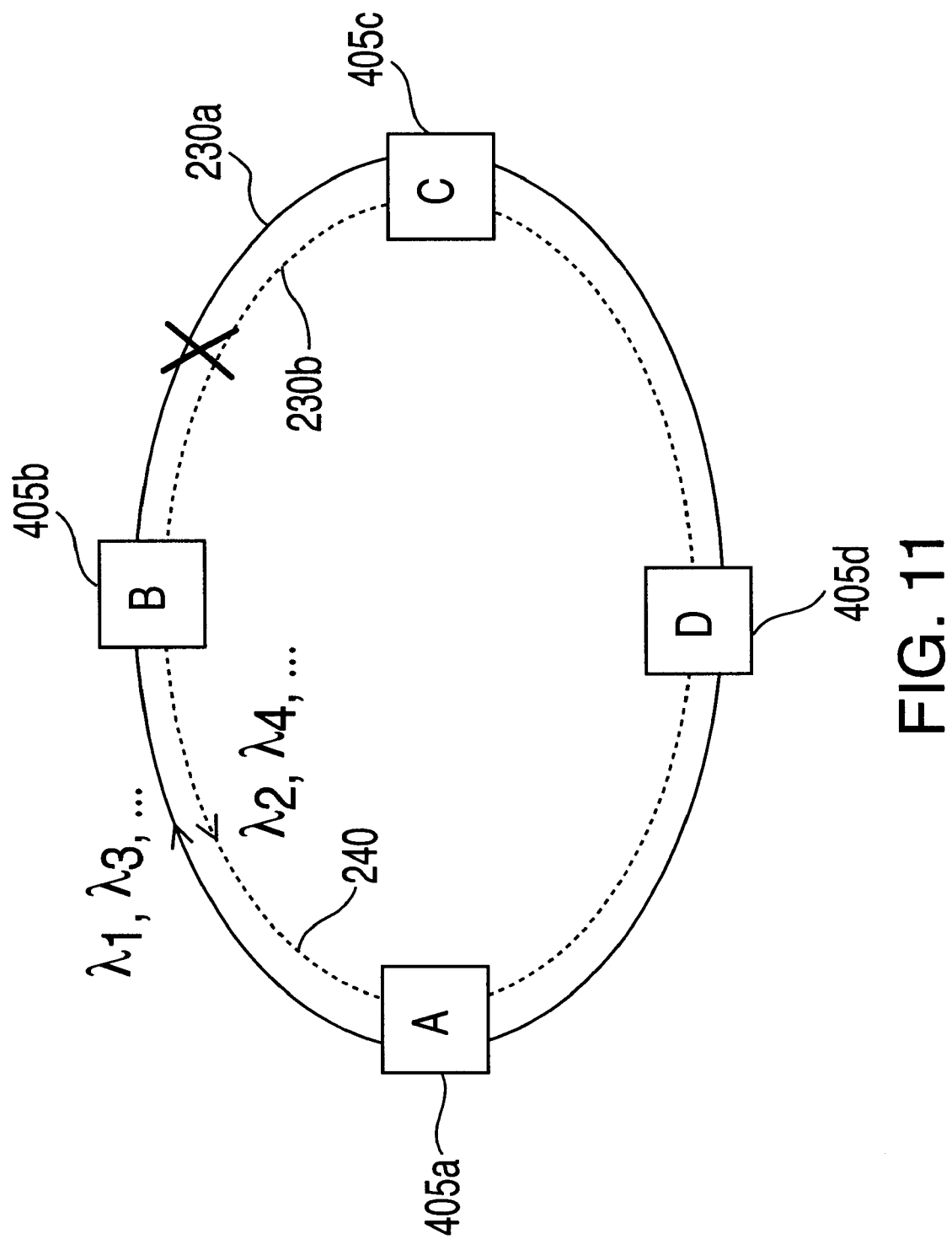
FIG. 11 depicts a bidirectional two-fiber ring network with a fiber failure on the east route of a WADM B according to one embodiment of the present invention.

FIG. 11 depicts a bidirectional two-fiber ring network with a fiber failure on the east route of WADM 405b according to one embodiment of the present invention. Note that this situation is similar to the fiber failure scenario depicted in FIG. 7 pertaining to the unidirectional fiber ring network.

Figure 1:
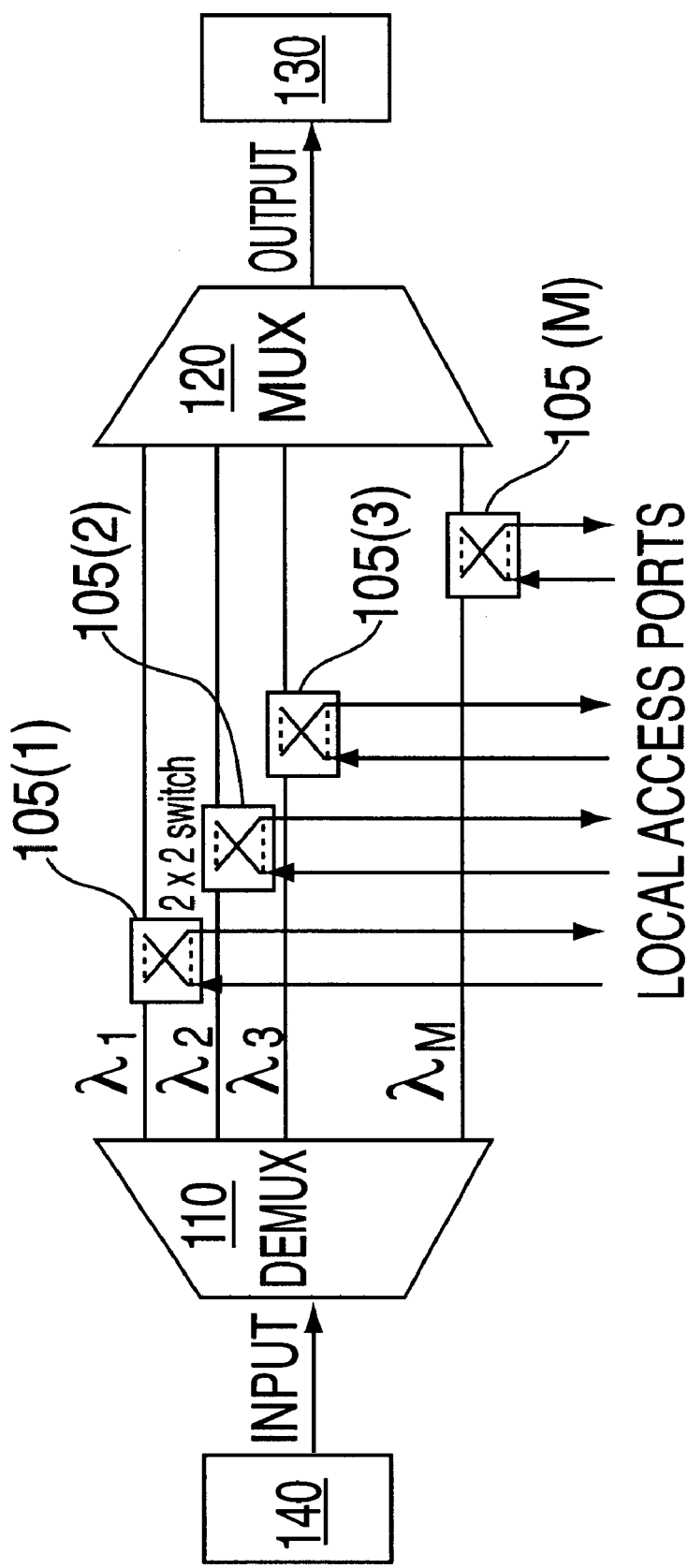
FIG. 1, which is prior art, depicts an example of a conventional WADM architecture.
Figure 2A:
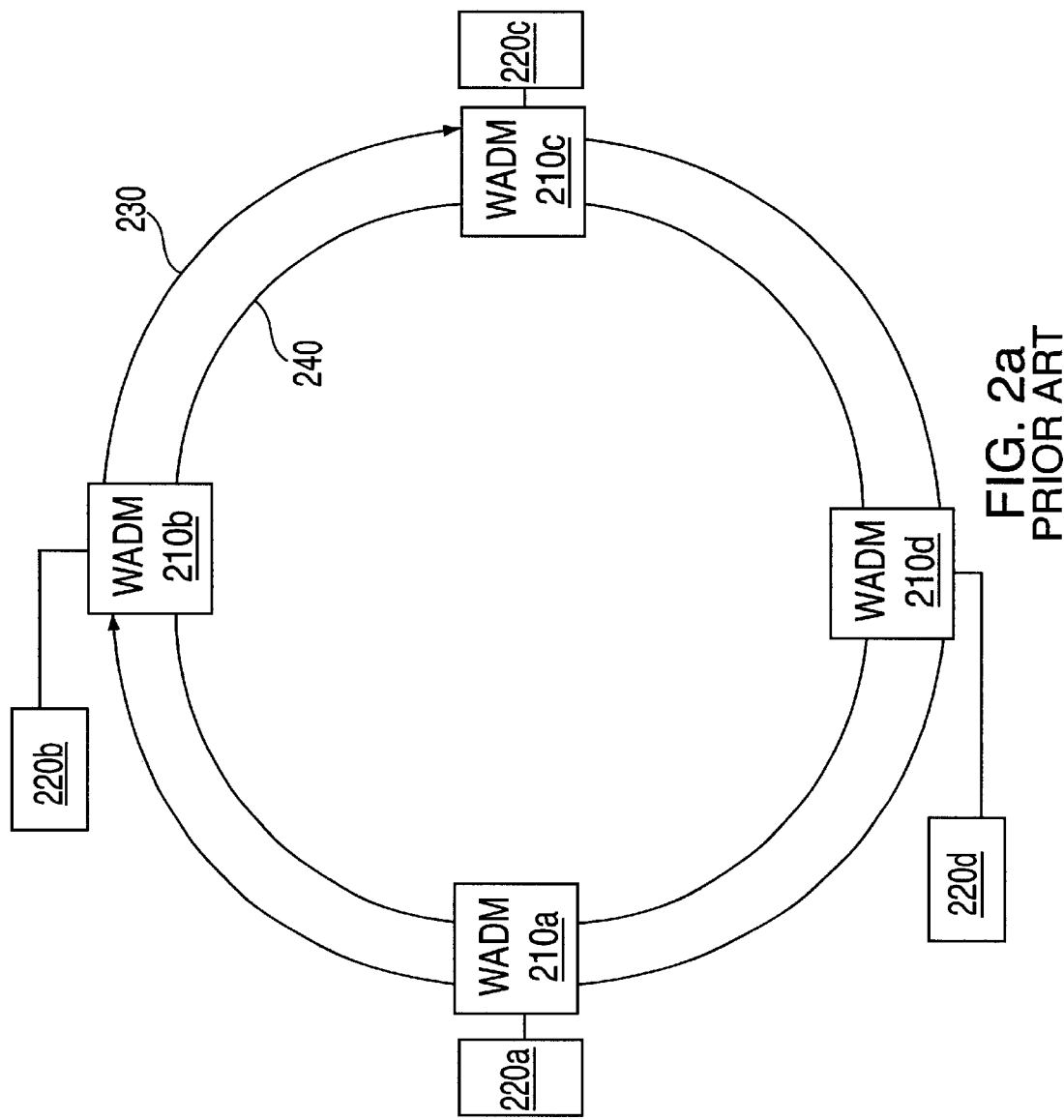
FIG. 2a, which is prior art, depicts the topology of a unidirectional ring network.
Figure 2B:
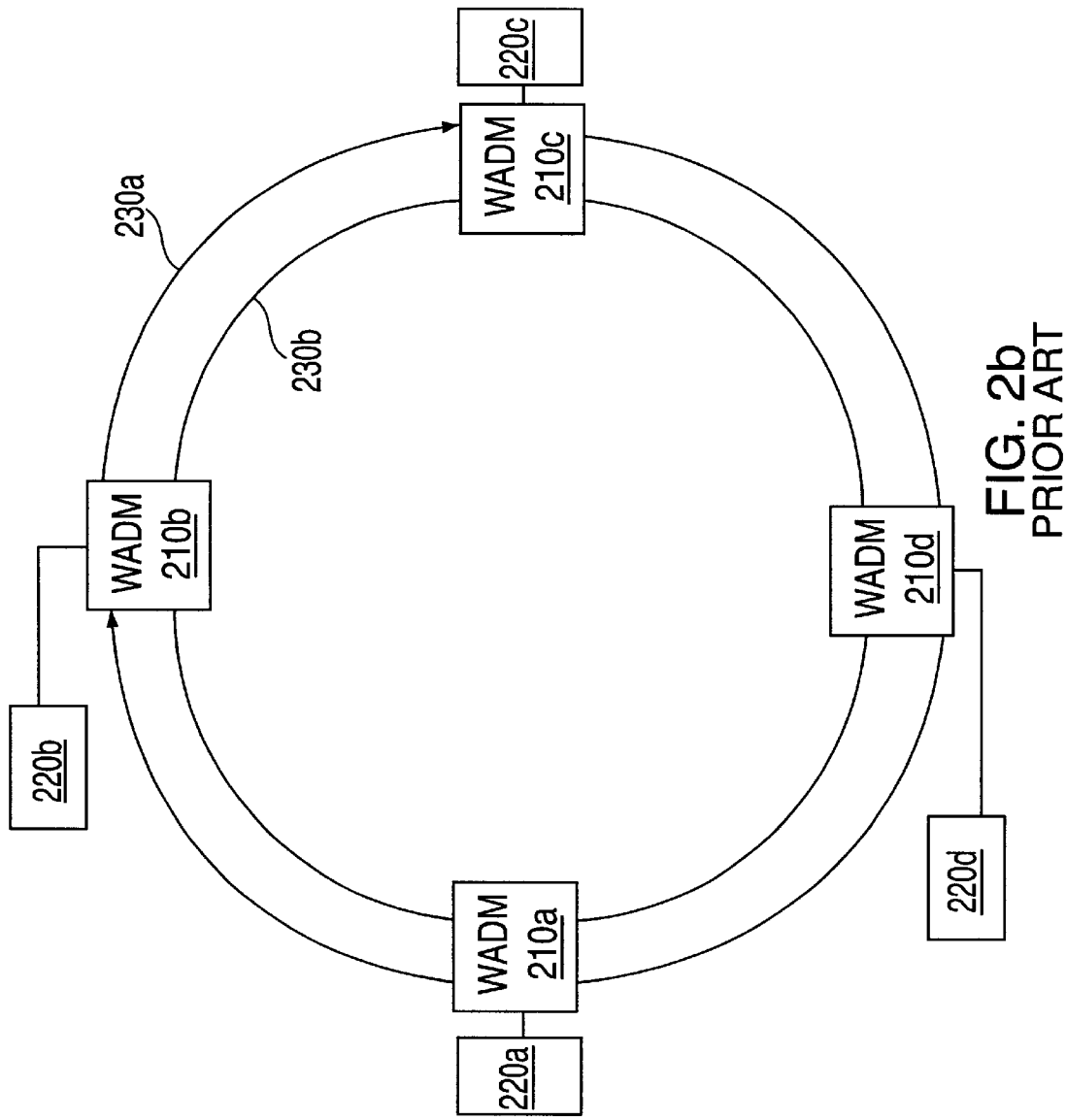
FIG. 2b, which is prior art, depicts the topology of a bi-directional two-fiber ring network.
Figure 3:
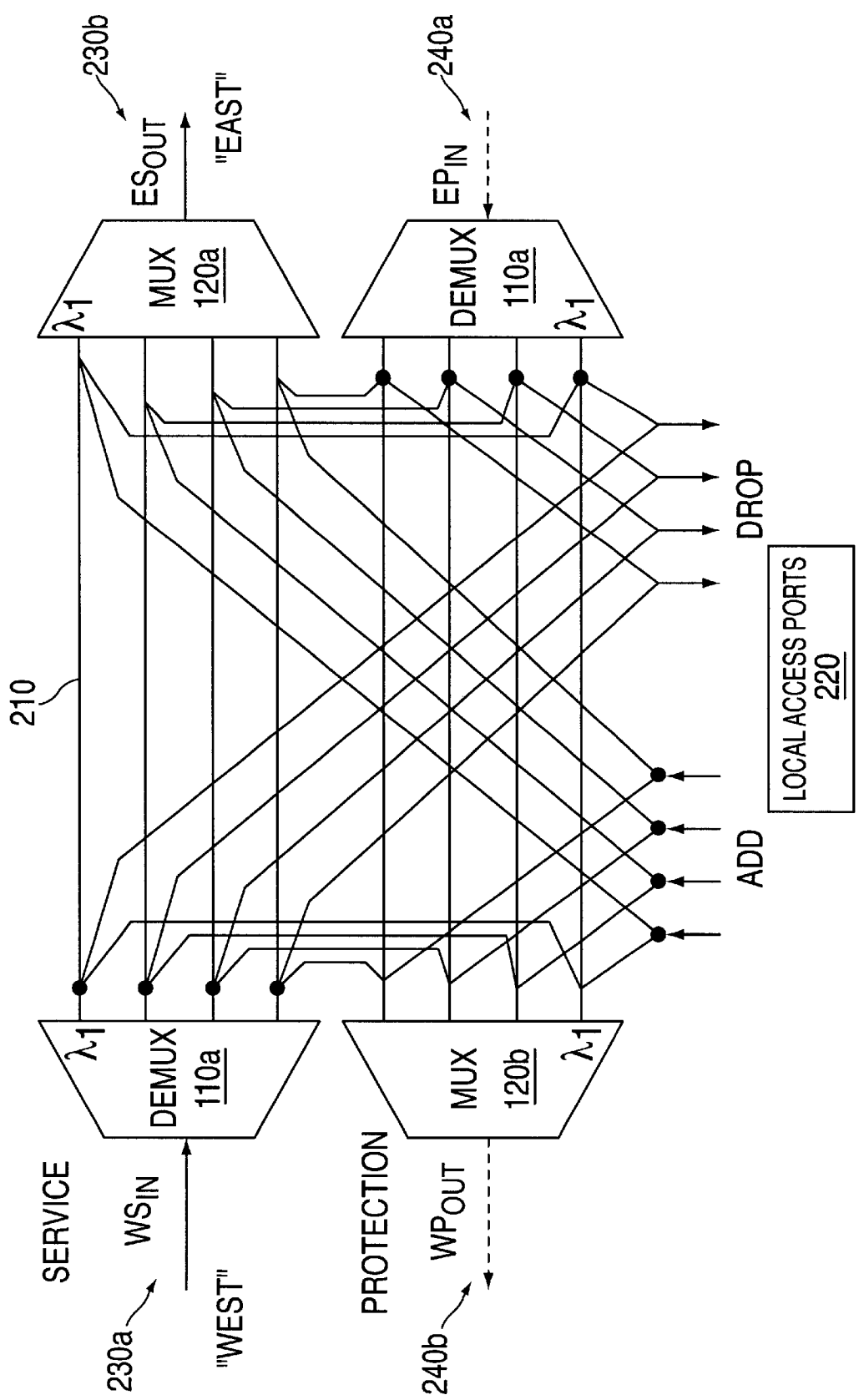
FIG. 3 depicts typical connectivity requirements for a WADM in a unidirectional ring network.
Figure 12:
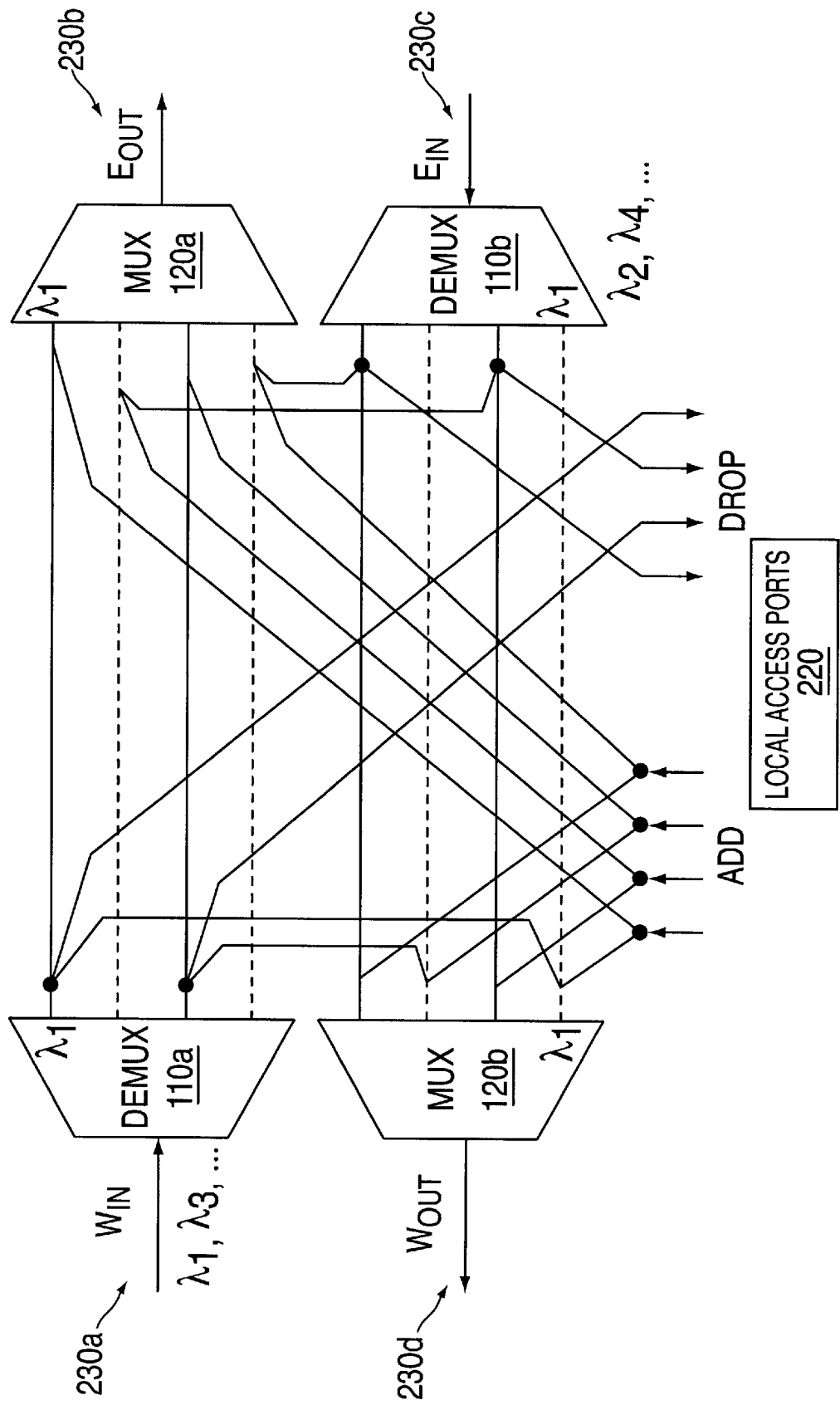
FIG. 12 depicts a WADM with multiple access ports in a bidirectional two-fiber network according to one embodiment of the present invention.

FIG. 12 depicts a WADM with multiple access ports in a bidirectional two-fiber network according to one embodiment of the present invention. Note that the connectivity requirements differ from the unidirectional case as shown in FIG. 3. In particular, FIG. 12 shows demultiplexer 110a receiving odd wavelengths signals from $W_{IN}$ fiber 230a. Odd number wavelengths may be added/dropped at WADM 405, with the resulting signal multiplexed via multiplexer 120a and transmitted to $ES_{OUT}$ fiber 230b. Even number wavelengths are also transmitted via demultiplexer 110a through WADM 405 to multiplexer 120a, forming a protection route (shown in thick dashed lines).

Demultiplexer 110b receives even number wavelengths from $E_{IN}$ fiber 230c. Even number wavelengths may be added/dropped at WADM 405, with the resulting signal multiplexed via multiplexer 120b and transmitted to $W_{OUT}$ fiber 230d. Odd number wavelengths are also transmitted via demultiplexer 110b through WADM 405 to multiplexer 120b, forming a protection route (shown in thick dashed lines).

Figure 13A:
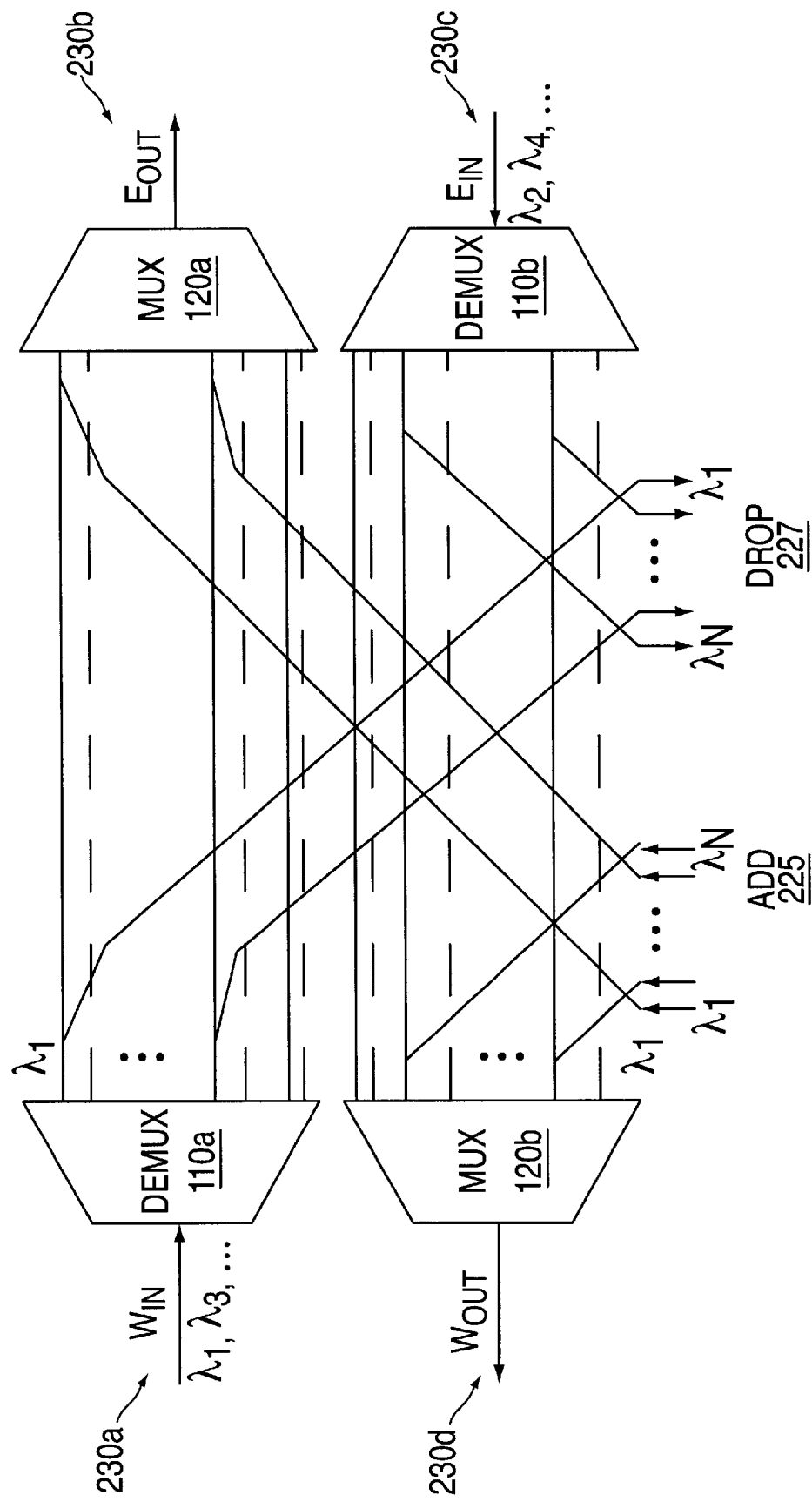
FIG. 13a depicts a WADM node with bidirectional traffic under the situation of normal service according to one embodiment of the present invention.
Figure 13B:
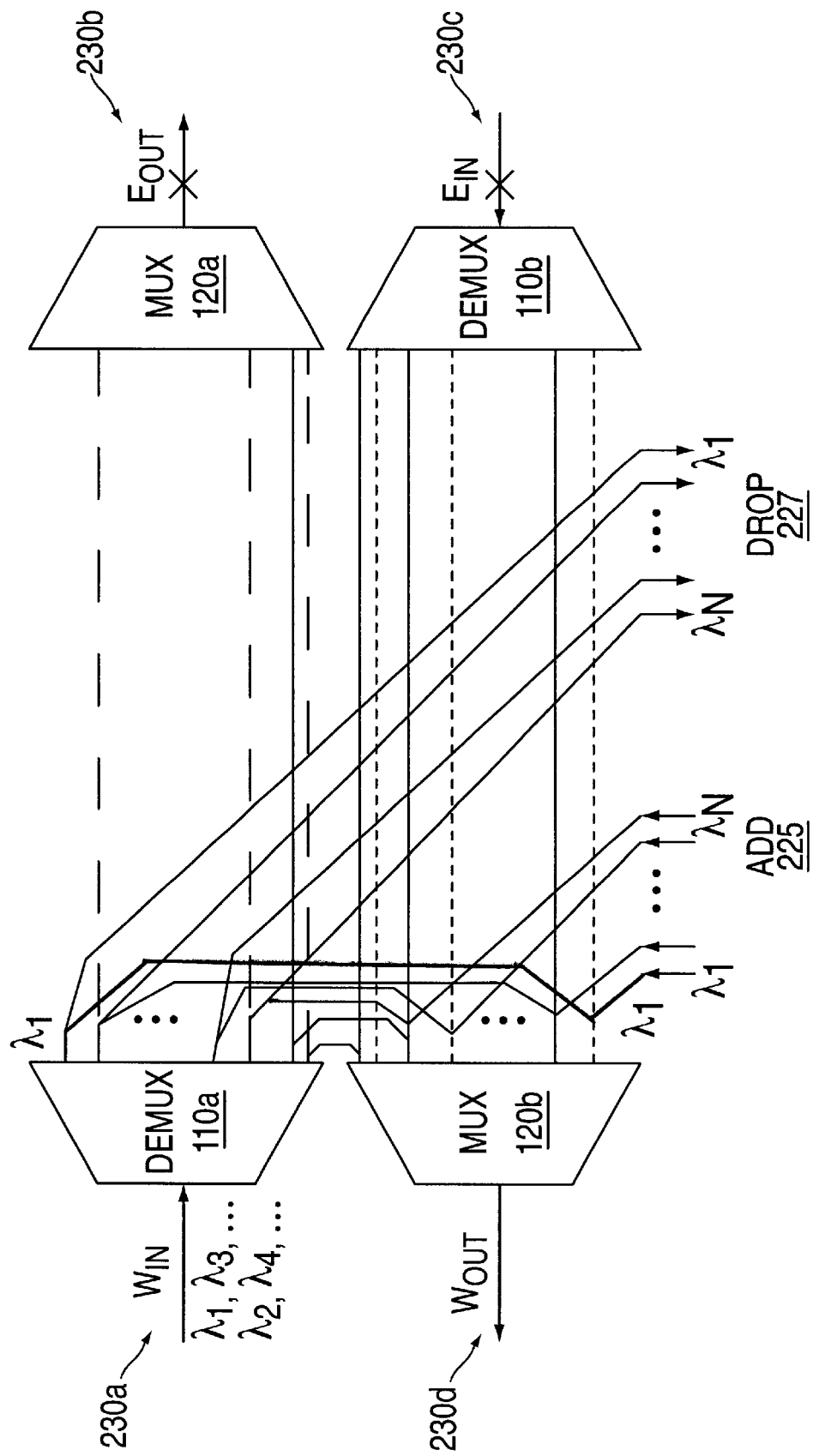
FIG. 13b depicts a WADM node with bidirectional traffic under the situation of failure on east side service and protection routes according to one embodiment of the present invention.
Figure 13C:
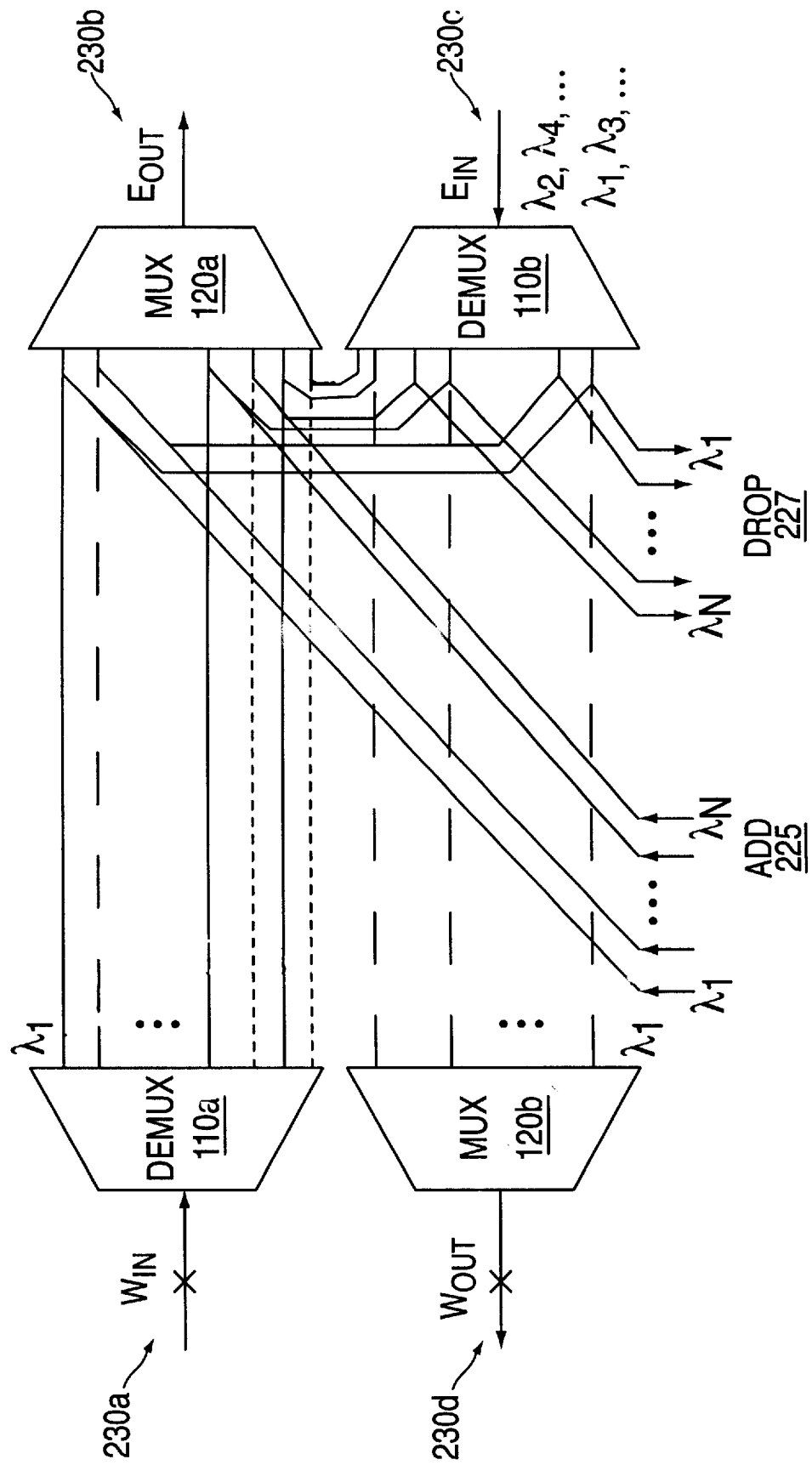
FIG. 13c depicts a WADM node with bidirectional traffic under the situation of failure on west side service and protection routes according to one embodiment of the present invention.
Figure 13D:
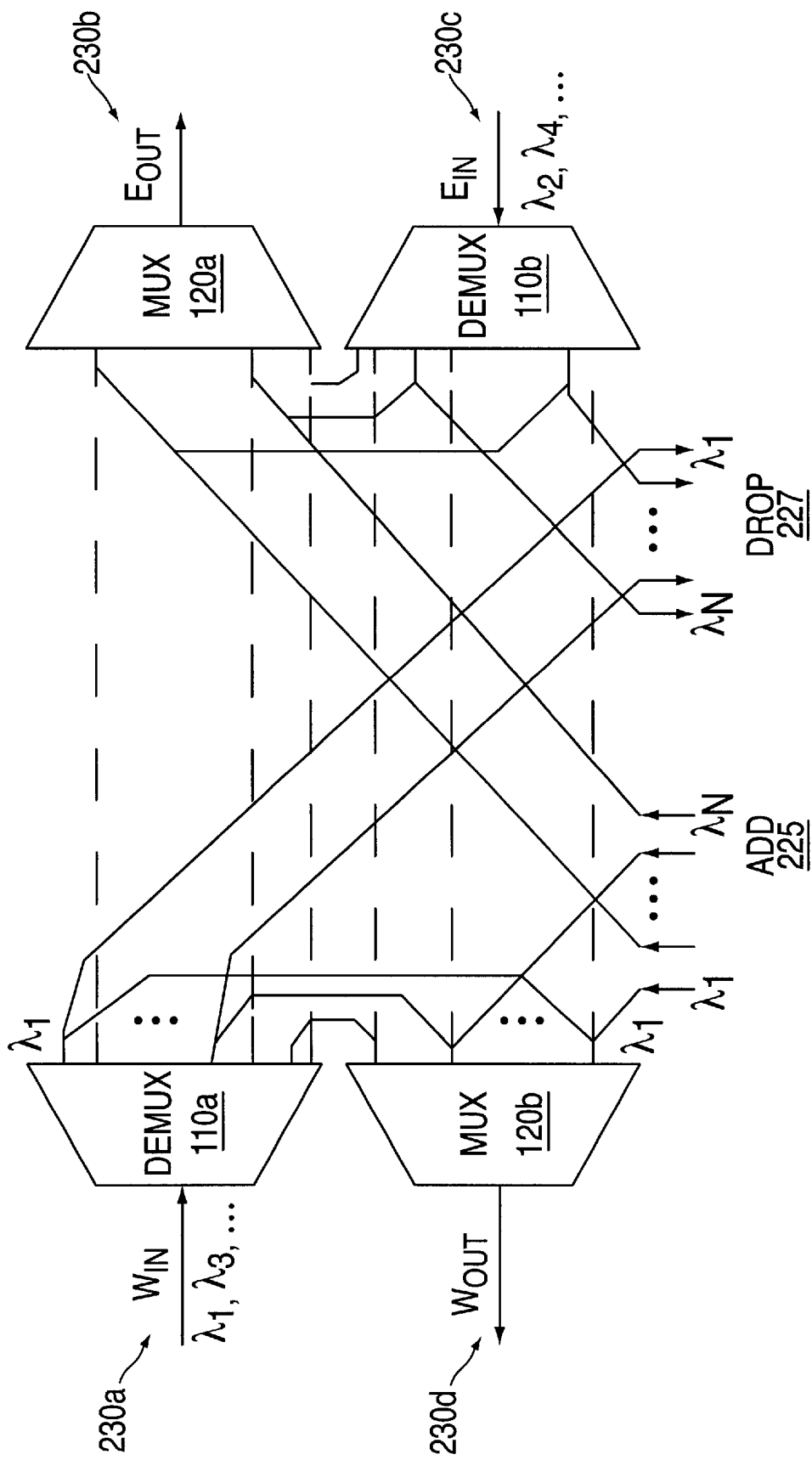
FIG. 13d depicts a WADM node with bidirectional traffic under the situation of loop-back according to one embodiment of the present invention.

FIGS. 13a–13d depict traffic flow for various WADM nodes in a bidirectional fiber network assuming a failure in the fiber as shown in FIG. 11. In particular, FIG. 13a depicts a WADM node operating in normal service. FIG. 13b depicts a WADM node operating with a failure on its east routes. FIG. 13c depicts a WADM node operating with a failure on its west routes. FIG. 13d depicts loop-back operation of a WADM node.

FIG. 13a depicts normal operation of a WADM node 405, in particular WADM 405a shown in FIG. 11. Note that odd wavelength signals arriving from $W_{IN}$ fiber route 230a may be added/dropped, while even wavelength signals arriving from $W_{IN}$ 230a fiber (shown in thick dashed lines) are passed through WADM node 405. Similarly, even wavelength signals arriving from $E_{IN}$ fiber route 230c may be added/dropped at WADM node 405, while odd wavelength (shown in thick dashed lines) signals are passed through the node.

FIG. 13b depicts the situation at WADM node 405b shown in FIG. 11 in which there is a failure on the $E_{OUT}$ 230b and $E_{IN}$ 230c fiber routes. In particular, signals from $W_{IN}$ 230a are dropped or switched to $W_{OUT}$ 230d and signals from add ports 225 are switched to $W_{OUT}$ 230d instead of $E_{OUT}$ 230b. Thus, as shown in FIG. 13b odd signals transmitted onto fiber route $W_{OUT}$ 230b form a protection route.

FIG. 13c depicts the situation at WADM node 405c shown in FIG. 11, in which there is a failure on fiber routes $W_{OUT}$ 230d and $W_{IN}$ 230a. In this case, signals from $E_{IN}$ 230c are dropped or switched to $E_{OUT}$ 230b and signals from add ports 225 are switched to $E_{OUT}$ 230b instead of $W_{OUT}$ 230d. Thus, as shown in FIG. 13c, even signals transmitted onto fiber route $E_{OUT}$ 230b form a protection route.

FIG. 13d depicts a loopback configuration for a WADM node 405 according to one embodiment of the present invention. In this case, odd signals arriving from $W_{IN}$ 230a are passed to $W_{OUT}$ 230d, while even signals arriving from $E_{IN}$ 230c are passed to $E_{OUT}$ 230b. Moreover, odd signals arriving from $W_{IN}$ 230a are added/dropped and passed through to $E_{OUT}$ 230b while even signals arriving from $E_{IN}$ 230c are added/dropped and passed through to $W_{OUT}$ 230d.

Figure 14A:
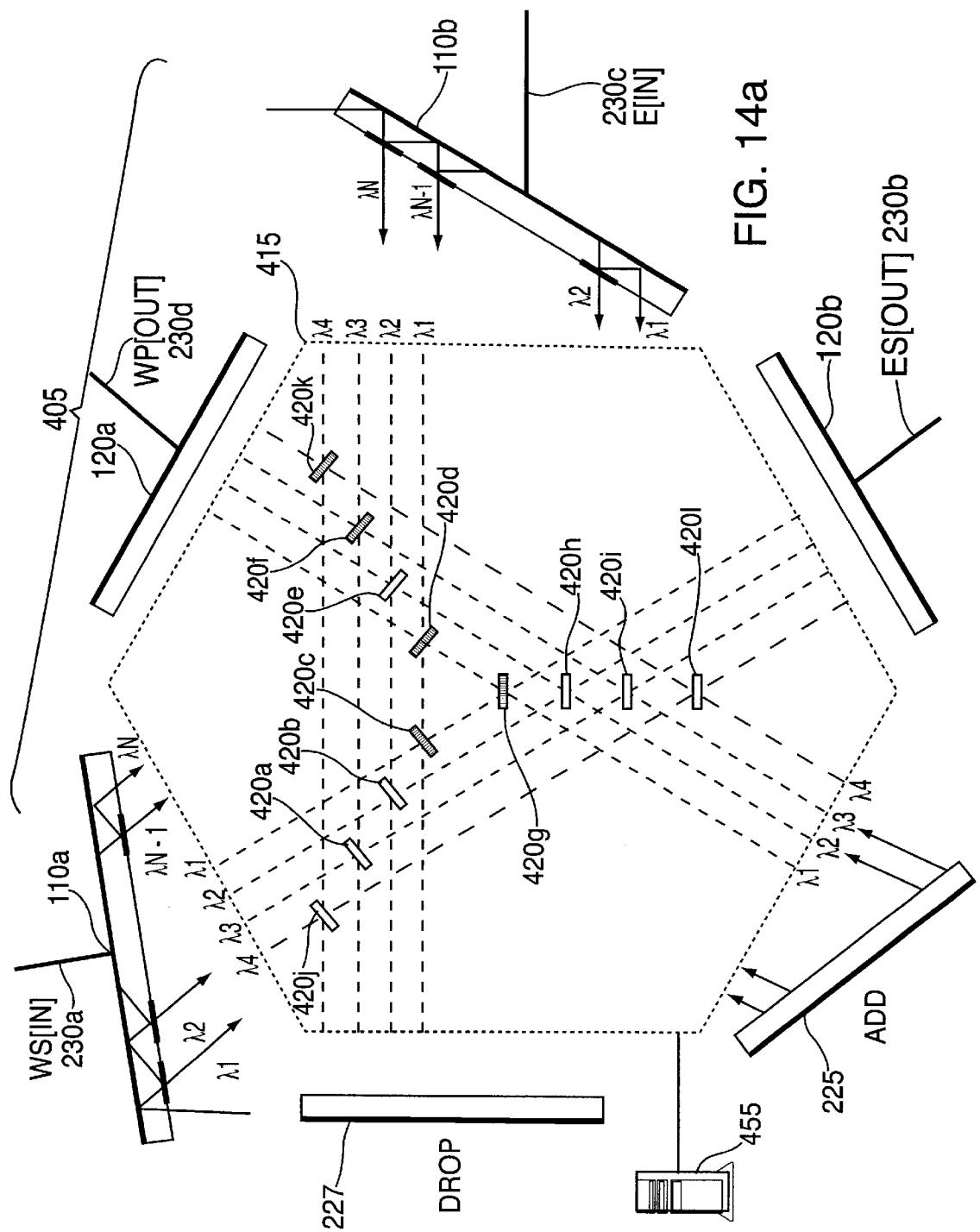
FIG. 14a depicts the configuration of a switching matrix of micromirrors in a WADM in a bidirectional two-fiber optical network under normal service conditions according to one embodiment of the present invention.

FIGS. 14a–14d depict an exemplary free space mirror configurations at a WADM in a bidirectional two-fiber network in various configurations according to one embodiment of the present invention. It is assumed for these examples that WADM 405 can switch wavelengths $\lambda_1$–$\lambda_4$. Also, it is assumed that wavelengths $\lambda_1$ and $\lambda_2$ are used by the local access ports. In FIG. 14a (corresponding to FIG. 14d (normal service at node 405a)) mirror 420c is on to reflect $\lambda_1$ from $W_{IN}$ 230a to drop port 227 and mirror 420g is on to reflect $\lambda_1$ from add port 225 to $E_{OUT}$ 230b. Similarly, mirrors 420b, 420h and 420e are off to transmit $\lambda_2$ from $E_{IN}$ 230c to drop port 227 and $\lambda_2$ from add 225 to $W_{OUT}$ 230d. The remaining through wavelengths from $W_{IN}$ 230a are transmitted to $E_{OUT}$ 230b, while the through wavelengths from $E_{IN}$ 230c are reflected to $W_{OUT}$ 230d by mirrors 420f and 420k.

Figure 14B:
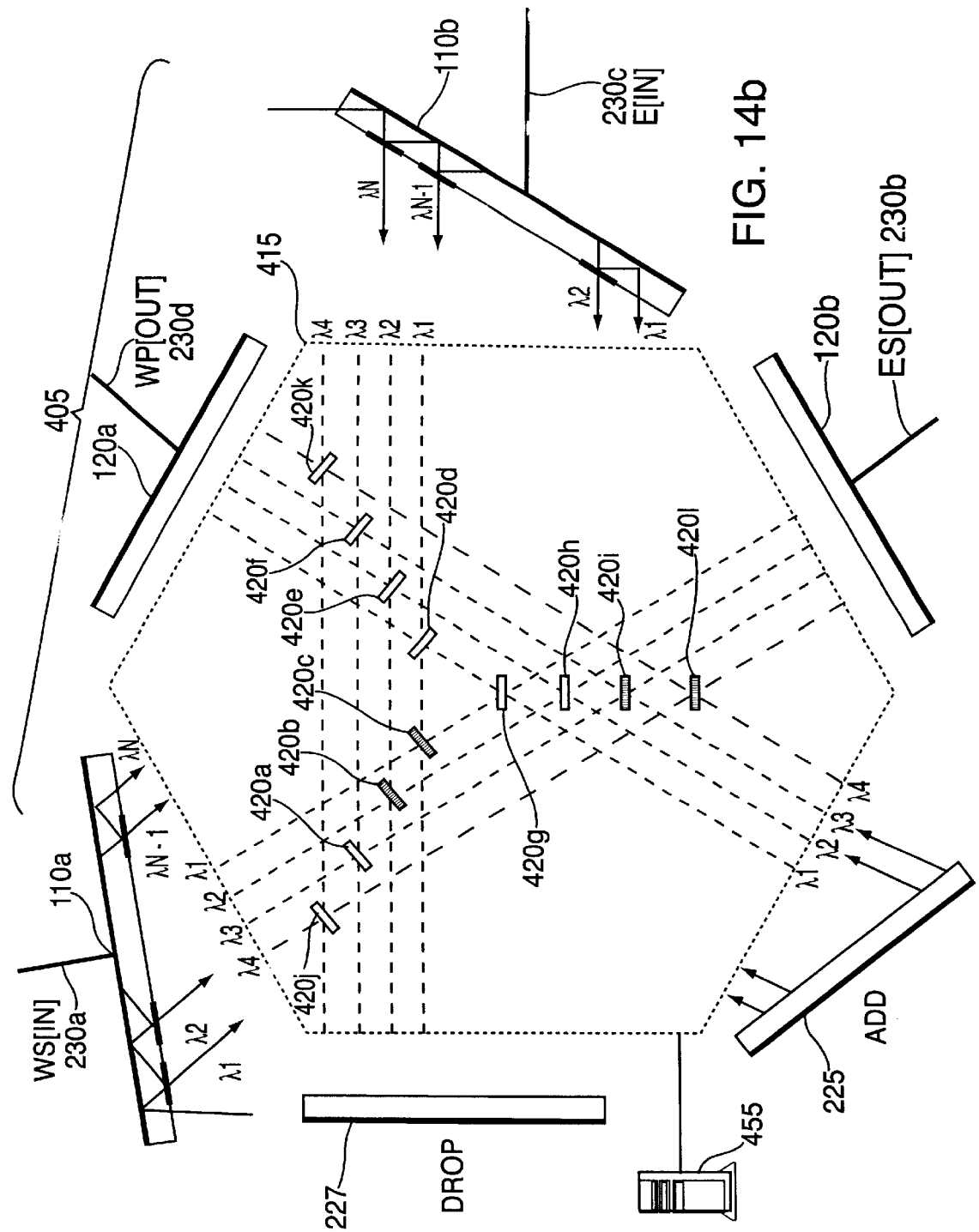
FIG. 14b depicts the configuration of a switching matrix of micromirrors in a WADM in a bidirectional two-fiber optical network under service failure of east side service and protection fiber routes according to one embodiment of the present invention.

FIG. 14b depicts a mirror configuration for a WADM 405 in a bidirectional two-fiber network with failure on east fiber routes (WADM 405b in FIG. 11). Instead of adding $\lambda_1$ to $E_{OUT}$ 230b, mirror 420g is now off to transmit $\lambda_1$ to the protection $W_{OUT}$ 230d. $\lambda_2$ arriving from $W_{IN}$ 230a is reflected to drop port 227 by mirror 420b. $\lambda_2$ from add 225 is transmitted to $W_{OUT}$ 230d. The unused wavelengths from $W_{IN}$ 230a are reflected to $W_{OUT}$ 230d by mirrors 420i and 420l.

Figure 14C:
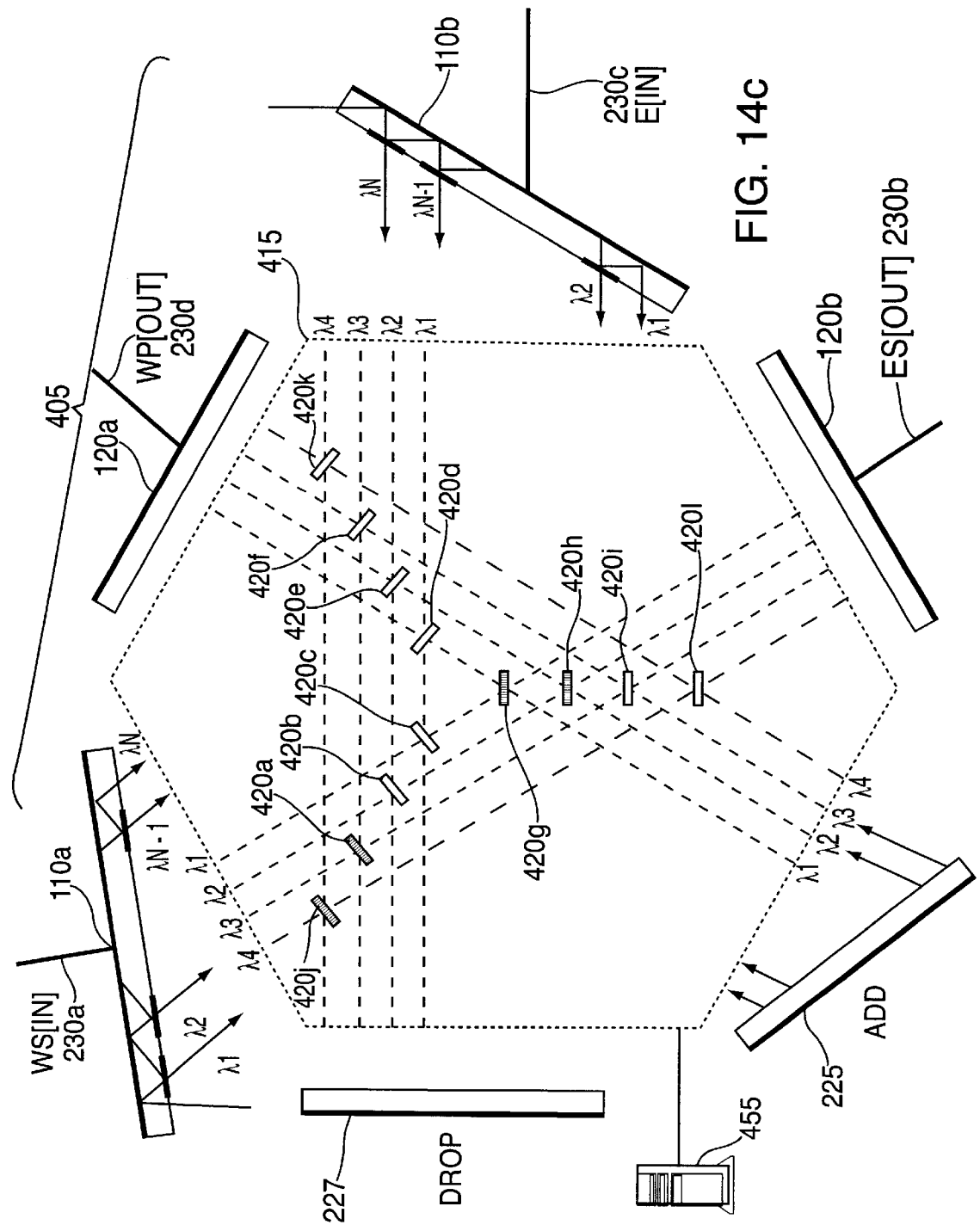
FIG. 14c depicts the configuration of a switching matrix of micromirrors in a WADM in a bidirectional two-fiber optical network under service failure of west side service and protection fiber routes according to one embodiment of the present invention.
Figure 14D:
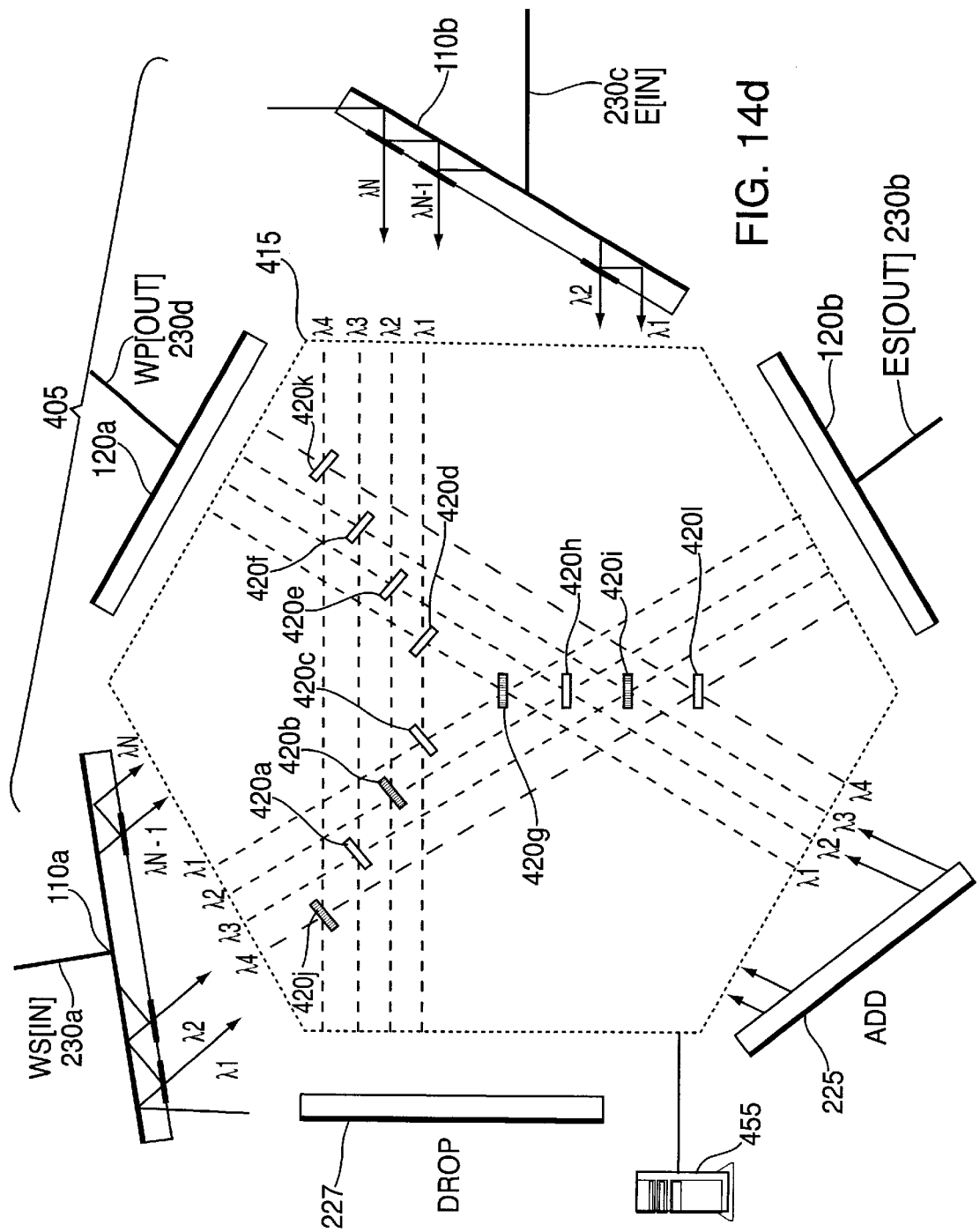
FIG. 14d depicts the configuration of a switching matrix of micromirrors in a WADM in a bidirectional two-fiber optical network under loop-back conditions according to one embodiment of the present invention.

FIG. 14c depicts a mirror configuration for a WADM 405 in a bidirectional two-fiber network with failure on west fiber routes (WADM 405c in FIG. 11). FIG. 14d depicts a mirror configuration for a WADM 405 in a bidirectional two-fiber network with failure in a loopback configuration. All odd wavelengths from $W_{IN}$ 230a are switched to $W_{OUT}$ 230d and all even wavelengths from $E_{IN}$ 230c are switched to $E_{OUT}$ 230b.

Figure 15:
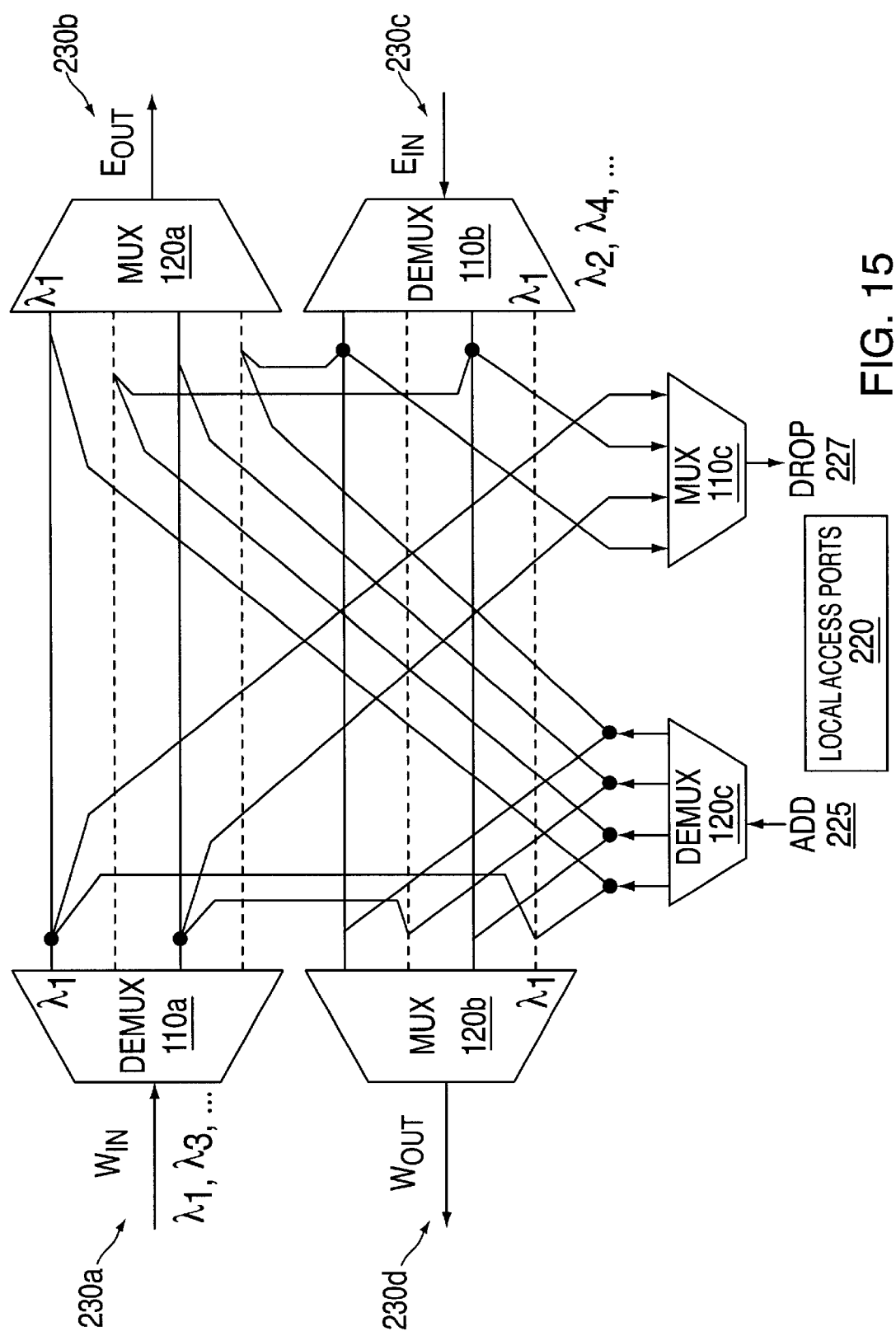
FIG. 15 depicts a WADM with a signal access port in a unidirectional two-fiber network according to one embodiment of the present invention.

FIG. 15 depicts a WADM with a signal access port in a bidirectional two-fiber network according to one embodiment of the present invention. The architecture depicted in FIG. 15 is similar to that shown in FIG. 12. However, WADM 405 includes additional demultiplexer 110c and multiplexer 120c. Thus, demultiplexer 110c and multiplexer 120c are combined in the access port 220 to combine the signals. This results in multiwavelength single-fiber access to the customer and therefore cost savings in fiber installation. Utilizing this approach WADM functions can be accomplished via the same mirror arrangement as depicted in FIGS. 14a–14d.

What is claimed is:

1. A wavelength add/drop multiplexer comprising:
a first demultiplexer coupled to a first input port for generating a first set of demultiplexed input signals from a first wavelength division multiplexed signal received at the first input port;

a first multiplexer coupled to a first output port for generating a first output wavelength division multiplexed signal for transmission to the first output port;

a second demultiplexer coupled to a second input port for generating a second set of demultiplexed signals from a second wavelength division multiplexed signal received at the second input port;

a second multiplexer coupled to a second output port for generating a second output wavelength division multiplexed signal for transmission to the second output port;

a third input port for receiving a set of add wavelengths from a local access port;

a third output port for dropping wavelengths to a local access port;

a reconfigurable switching matrix comprising a plurality of free-space micromirrors, each of the micromirrors placed selectively in one of an actuated or a non-actuated state.

2. The wavelength add/drop multiplexer according to claim 2, wherein the first input port is coupled to a west service fiber, the first output port is coupled an east service fiber, the second input port is coupled to an east protection fiber and the second output port is coupled to a west protection fiber, wherein the west and east service fibers and the west and east protection fibers are included in a unidirectional two-fiber optical network.

3. The wavelength add/drop multiplexer according to claim 2, wherein the first input wavelength division multiplexed signal includes a first set of add/drop wavelengths (N) from the west service fiber, wherein for each of the first set of add/drop wavelengths (N), the wavelength add/drop multiplexer either performs an add/drop operation or passes the wavelength through the add/drop multiplexer and a first set of through wavelengths (M).

4. The wavelength add/drop multiplexer according to claim 3, wherein the second input wavelength division multiplexed signal includes a second set of add/drop wavelengths (N) from the east protection fiber, wherein for each of the second set of add/drop wavelengths (N), the wavelength add/drop multiplexer either performs an add/drop operation or passes the wavelength through the add/drop multiplexer and a second set of through wavelengths (M).

5. The wavelength add/drop multiplexer according to claim 4, wherein the switching matrix may be configured to be in one of a normal operation state, an east side failure protection state, a west side failure protection state and a loop-back state.

6. The wavelength add/drop multiplexer according to claim 5, wherein in the normal operation state and the east side failure protection each of the micromirrors are switched into one of an actuated or non-actuated state to perform an add/drop operation on a selected set of the first set of add/drop wavelengths from the first input wavelength division multiplexed signal.

7. The wavelength add/drop multiplexer according to claim 6, wherein in the normal operation state the add/drop operation includes routing the selected set of the first set of add/drop wavelengths to the third output port, routing a selected set of the add wavelengths to the first multiplexer, routing the first set of through wavelengths to the first multiplexer and routing the second set of add/drop wavelengths and the second set of through wavelengths to the second multiplexer.

8. The wavelength add/drop multiplexer according to claim 6, wherein in the east side failure protection state the add/drop operation includes routing the selected set of the first set of add/drop wavelengths to the third output port, routing a selected set of the add wavelengths to the second multiplexer and routing the first set of through wavelengths to the second multiplexer.

9. The wavelength add/drop multiplexer according to claim 6, wherein in the west side failure protection state each of the micromirrors are switched into one of an actuated or non-actuated state to perform an add/drop operation on a selected set of the second set of add/drop wavelengths from the second input wavelength division multiplexed signal.

10. The wavelength add/drop multiplexer according to claim 9, wherein in the west side failure protection state the add/drop operation includes routing the selected set of the second set of add/drop wavelengths to the third output port, routing a selected set of the add wavelengths to the first multiplexer and routing the second set of through wavelengths to the first multiplexer.

11. The wavelength add/drop multiplexer according to claim 5, wherein in the loop-back state the first set of add/drop wavelengths and the first set of through wavelengths are routed to the second multiplexer, a selected set of the first add/drop wavelengths are routed to the third output port, a selected set of the add wavelengths are routed to the first multiplexer and the second set of add/drop wavelengths and the second set of through wavelengths are routed to the first multiplexer.

12. The wavelength add/drop multiplexer according to claim 1, wherein the micromirrors are arranged in a hexagonal geometry.

13. A wavelength add/drop multiplexer comprising:
a first demultiplexer coupled to a first input port for generating a first set of demultiplexed input signals from a first wavelength division multiplexed signal received at the first input port;

a first multiplexer coupled to a first output port for generating a first output wavelength division multiplexed signal for transmission to the first output port;

a second demultiplexer coupled to a second input port for generating a second set of demultiplexed signals from a second wavelength division multiplexed signal received at the second input port;

a second multiplexer coupled to a second output port for generating a second output wavelength division multiplexed signal for transmission to the second output port;

a third demultiplexer for demultiplexing a wavelength division multiplexed signal received from a local access port;

a third multiplexer for multiplexing a plurality of signals for transmission to a local access port;

a reconfigurable switching matrix comprising a plurality of free-space micromirrors, each of the micromirrors placed selectively in one of an actuated or a non-actuated state.

14. An unidirectional two-fiber optical network comprising:
a service fiber route;
a protection fiber route;
at least one wavelength add/drop multiplexer, wherein each of the wavelength add/drop multiplexer divides the service fiber route and the protection fiber route into a plurality of segments, wherein each of the wavelength add/drop multiplexers comprises:
a first input port coupled to a first segment of the service fiber route;

a first output port coupled to a second segment of the service fiber route;

a second input port coupled to a first segment of the protection fiber route;

a second output port coupled to a second segment of the protection fiber route;

a first demultiplexer coupled to the first input port for generating a first set of demultiplexed input signals from a first wavelength division multiplexed signal received at the first input port;

a first multiplexer coupled to the first output port for generating a first output wavelength division multiplexed signal for transmission to the first output port;

a second demultiplexer coupled to the second input port for generating a second set of demultiplexed signals from a second wavelength division multiplexed signal received at the second input port;

a second multiplexer coupled to a second output port for generating a second output wavelength division multiplexed signal for transmission to the second output port;

a third demultiplexer for demultiplexing a wavelength division multiplexed signal received from a local access port;

a third multiplexer for multiplexing a plurality of signals for transmission to a local access port;

a reconfigurable switching matrix comprising a plurality of free-space micromirrors, each of the micromirrors placed selectively in one of an actuated or a non-actuated state.

15. An bidirectional two-fiber optical network comprising:

a first service/protection fiber route;

a second service/protection fiber route;

at least one wavelength add/drop multiplexer, wherein each of the wavelength add/drop multiplexer divides the first and second service/protection fiber routes into a plurality of segments, wherein each of the wavelength add/drop multiplexers comprises:

a first input port coupled to a first segment of the first service/protection fiber route;

a first output port coupled to a second segment of the first service/protection fiber route;

a second input port coupled to a first segment of the second service/protection fiber route;

a second output port coupled to a second segment of the second service/protection fiber route;

a first demultiplexer coupled to the first input port for generating a first set of demultiplexed input signals from a first wavelength division multiplexed signal received at the first input port;

a first multiplexer coupled to the first output port for generating a first output wavelength division multiplexed signal for transmission to the first output port;

a second demultiplexer coupled to the second input port for generating a second set of demultiplexed signals from a second wavelength division multiplexed signal received at the second input port;

a second multiplexer coupled to a second output port for generating a second output wavelength division multiplexed signal for transmission to the second output port;

a third demultiplexer for demultiplexing a wavelength division multiplexed signal received from a local access port;

a third multiplexer for multiplexing a plurality of signals for transmission to a local access port;

a reconfigurable switching matrix comprising a plurality of free-space micromirrors, each of the micromirrors placed selectively in one of an actuated or a non-actuated state.

* * * * *